US012614224B2

(12) United States Patent
Wong et al.

(10) Patent No.: US 12,614,224 B2
(45) Date of Patent: Apr. 28, 2026

(54) MODULAR AUTOMATED RETAIL STORE AND SYSTEM

(71) Applicant: SHOALTER AUTOMATION LIMITED, Hong Kong (CN)

(72) Inventors: Wai Kay Wong, Hong Kong (CN); Chi Kong Lau, Hong Kong (CN); Wai Kin Wong, Hong Kong (CN); Clement Chek Bong Cheung, Hong Kong (CN)

(73) Assignee: Shoalter Automation Limited, Hong Kong (CN)

( * ) Notice: Subject to any disclaimer, the term of this patent is extended or adjusted under 35 U.S.C. 154(b) by 272 days.

(21) Appl. No.: 18/245,325

(22) PCT Filed: Jan. 9, 2023

(86) PCT No.: PCT/CN2023/071376
§ 371 (c)(1),
(2) Date: Mar. 14, 2023

(87) PCT Pub. No.: WO2024/108751
PCT Pub. Date: May 30, 2024

(65) Prior Publication Data
US 2025/0078141 A1      Mar. 6, 2025

(30) Foreign Application Priority Data

Nov. 23, 2022    (HK) ............................ 22022064364.1

(51) Int. Cl.
*G06Q 30/0601*       (2023.01)
*G06Q 10/0836*       (2023.01)
*G06Q 10/087*        (2023.01)
(52) U.S. Cl.
CPC ..... *G06Q 30/0635* (2013.01); *G06Q 10/0836* (2013.01); *G06Q 10/087* (2013.01); *G06Q 30/0641* (2013.01)

(58) Field of Classification Search
CPC ........... G06Q 30/0635; G06Q 10/0836; G06Q 10/087; G06Q 30/0641; G06Q 10/08;
(Continued)

(56) References Cited

U.S. PATENT DOCUMENTS 8,721,251 B1 * 5/2014 Razumov ............. B65G 1/0492
414/281
9,008,827 B1 4/2015 Dwarakanath et al.
(Continued)

FOREIGN PATENT DOCUMENTS

CN      104695809 A     6/2015
CN      105049528 A     11/2015
(Continued)

OTHER PUBLICATIONS

Mobile Robot for Retail Inventory Using RFID (Year: 2016).*
(Continued)

*Primary Examiner* — Victoria E. Frunzi
(74) *Attorney, Agent, or Firm* — Haynes and Boone, LLP

(57) ABSTRACT

This application relates to a retail system. The system includes a store control system controlled by signals generated based on order information for a customer including information representing items and a pickup time. The system further includes storage shelf units with internal portions having different predefined modular configurations, for storing a removable storage container; locker units with internal portions for providing a locker compartment; and item retrieval systems controlled by said store control system to retrieve ordered items from storage containers, place those items into a delivery container, which is then placed into a locker compartment. The system further includes a verification system adapted to operate under the control of said store control system for verifying the customer's identity or unique identifier for said order.

26 Claims, 18 Drawing Sheets

(58) Field of Classification Search

CPC .... G06Q 20/18; G06Q 30/0603; G07F 11/62; G07F 9/105; G07F 17/12; G07F 17/13; A47G 29/141; B65G 1/1373

See application file for complete search history.

(56) References Cited

U.S. PATENT DOCUMENTS

| | | | | |
|---|---|---|---|---|
| 9,679,326 | B2 * | 6/2017 | Elberbaum | ............... H04L 5/14 |
| 9,767,432 | B1 | 9/2017 | Brazeau et al. | |
| 10,577,180 | B1 | 3/2020 | Mehta et al. | |
| 10,683,171 | B2 * | 6/2020 | Jarvis | ................. B65G 1/1375 |
| 10,947,043 | B2 * | 3/2021 | Lindbo | ................ B65G 1/1373 |
| 2002/0077937 | A1 * | 6/2002 | Lyons | .................... G06Q 30/06 705/28 |
| 2015/0106291 | A1 | 4/2015 | Robinson et al. | |
| 2015/0254603 | A1 | 9/2015 | Bashkin | |
| 2016/0198846 | A1 * | 7/2016 | McCuistion | .......... A47F 5/0087 211/150 |
| 2016/0304281 | A1 * | 10/2016 | Elazary | .................... B25J 15/06 |
| 2017/0215620 | A1 | 8/2017 | Dade et al. | |
| 2019/0066041 | A1 * | 2/2019 | Hance | .................... B65G 1/137 |
| 2019/0283648 | A1 | 9/2019 | Skaaksrud | |
| 2019/0352092 | A1 * | 11/2019 | Zheng | ................. B65G 1/0435 |
| 2020/0327768 | A1 | 10/2020 | Rossano et al. | |
| 2020/0334625 | A1 | 10/2020 | Li | |
| 2020/0349794 | A1 | 11/2020 | Belte | |
| 2020/0387857 | A1 * | 12/2020 | Smith | .................... G06Q 20/18 |
| 2021/0133668 | A1 | 5/2021 | Mikayelyan | |
| 2021/0295242 | A1 | 9/2021 | Rathi et al. | |
| 2022/0097969 | A1 * | 3/2022 | Brady | ................. B65G 1/1378 |
| 2022/0105854 | A1 | 4/2022 | Matsushita et al. | |
| 2022/0127073 | A1 | 4/2022 | Pai et al. | |
| 2022/0292475 | A1 | 9/2022 | Sasidharakurup et al. | |
| 2022/0315338 | A1 * | 10/2022 | Malhotra | ............. B65G 1/1373 |
| 2022/0315341 | A1 | 10/2022 | Degfae et al. | |
| 2022/0327599 | A1 | 10/2022 | Krishnamoorthy et al. | |

FOREIGN PATENT DOCUMENTS

| | | | | |
|---|---|---|---|---|
| CN | 109754532 | A | 5/2019 | |
| CN | 113840698 | A | 12/2021 | |
| EP | 3071076 | | 5/2015 | |
| EP | 3617099 | A1 | 3/2020 | |
| EP | 3904791 | A1 | 11/2021 | |
| GB | 2609678 | A | 2/2023 | |
| JP | 2021111148 | A | 8/2021 | |
| TW | M460350 | U | 8/2013 | |
| TW | 202109397 | A | 3/2021 | |
| TW | 202221583 | A | 6/2022 | |
| WO | 2015100390 | A1 | 7/2015 | |
| WO | 2017100170 | A1 | 6/2017 | |
| WO | WO-2018165444 | A1 * | 9/2018 | .......... G06Q 20/145 |
| WO | 2019051505 | A1 | 3/2019 | |
| WO | 2019089923 | A1 | 5/2019 | |
| WO | 2019242695 | A1 | 12/2019 | |
| WO | 2021038437 | A1 | 3/2021 | |
| WO | 2021191335 | A1 | 9/2021 | |
| WO | 2023010700 | A1 | 2/2023 | |

OTHER PUBLICATIONS

Estimating econsumers attitude towards parcel locker usage (Year: 2020).*

Australian Patent Office, "Examination Report No. 1", Application No. 2023201169, Mar. 14, 2024, 12 pages.

* cited by examiner

MODULAR AUTOMATED RETAIL STORE AND SYSTEM

This application is a national phase application of PCT/CN2023/071376, filed Jan. 9, 2023, which claims priority to and the benefit of Hong Kong application Ser. No. 22/022,064364.1, filed Nov. 23, 2022, both of which are incorporated herein in their entireties.

FIELD

The present invention relates to an unmanned store, and in particular, an automated storage and retailing system for providing scheduled handling of customer orders at a single retail site (e.g. at a shop location or retail facility).

BACKGROUND

Retail stores are an essential part of our society, allowing consumers to easily purchase goods they need for everyday life. However, the density of items stocked in a typical store is not efficiently optimised. For example, the height of shelves is typically designed to be only the reachable height of a typical customer, and extra aisle space needs to be reserved for customer walkways. Thus, the physical and space constraints of a store places limitations on the range, quantity and type of items that the store can offer to customers, and also affects the customer's shopping experience.

As customers adapt to changing circumstances and priorities, customer purchaser behaviour has evolved with a growing emphasis on availability, flexibility and convenience. In particular, customers value the choice of buying from a wide range of quality items, receiving their purchased items as soon as possible, and to make a purchase in a way (and at a time) that is easy and most convenient for the customer. Traditional physical stores run by staff can only satisfy some of these objectives. For example, it is almost impossible to run a store continuously 24 hours a day without needing extra staff, which adds to cost.

Online shopping sites provide an alternative shopping experience. Customers can remotely order from a wide selection of items (anywhere and at any time) through an online shopping platform. However, some human involvement is still required in the fulfilment process (e.g. to pick, pack or deliver the ordered items), which if not properly managed, can result in errors or delay.

Various automated shop solutions have been proposed. For example, Robomart Inc. has created an autonomous grocery store on wheels that offers customers the ability to pick their own groceries at home checkout-free. But the variety of groceries are limited by vehicle size and this retail business is limited by the traffic development of the city, for instance, underdeveloped roads and busy traffic. Amazon Go and 7-Eleven Signature are examples of stores that have automated the check-out process. It offers customers to walk around the shop, select and purchase groceries without requiring a cashier system. But it still requires manpower to refill, re-stock groceries to shelves and to remove the expired groceries from shelves.

Various kinds of automated convenience store have also been proposed, which generally are either robotic vending machines or vending machines that are integrated with a number of robotic components. It only offers customers instant shopping service to pick their items (e.g. soft drinks, groceries), but still requires manpower to re-stock groceries to shelves and to remove the expired groceries from shelves.

The present invention aims to address one or more of the above problems.

SUMMARY OF THE INVENTION

According to one aspect of the present invention, there is provided a retail system including:

an online ordering system for receiving an order from a customer;

a plurality of automated retail store systems located at different retail sites, each said automated retail store system being adapted to store a variety of different items;

a retail management system for receiving, from said online ordering system, order information relating to said order, and based on said order information, controlling the operation of a said automated retail store system selected by said customer for said order; and wherein the selected said automated retail store system, under the control of said retail management system, is configured to use one or more item retrieval systems to: (i) retrieve from a storage shelf unit identified by said retail management system one or more stored items corresponding to the items identified in said order information, and (ii) at a scheduled time before a pickup time specified in said order information, place the retrieved items into a locker compartment of a customer locker unit, wherein said locker compartment is only accessible by said customer after verification of said customer;

wherein each said item retrieval system comprises of at least: (i) one or more predefined modules configured according to one of several predetermined configurations, and (ii) a control unit for controlling the operations performed by the predefined modules of said item retrieval system, said control unit being adapted to operate under the control of a store control system and/or said retail management system.

According to another aspect of the present invention, there is provided an automated retail store system for providing automated storage and retrieval of multiple items identified in a customer order at a single retail site, the system including:

a store control system adapted to operate under the control of control signals generated based on order information for an order by a customer, said order information including information representing one or more items and a pickup time;

one or more storage shelf units, each said storage shelf unit having different internal portions provided according to different predefined modular configurations, each said storage shelf unit having at least one said internal portion configured to provide a storage compartment for storing one or more removable storage containers, said storage containers for storing a range of different items;

one or more customer locker units, each said customer locker unit having different internal portions provided according to different predefined modular configurations, each said customer locker unit having at least one said internal portion configured to provide a customer locker compartment;

one or more item retrieval systems adapted to operate under the control of said store control system to: retrieve a plurality of said items identified in said order information from said storage containers, place said retrieved items into a delivery container, and placed said delivery container into a said customer locker compartment based on said pickup time;

wherein each said item retrieval system comprises of at least: (i) one or more predefined modules configured according to one of several predetermined configurations, and (ii) a control unit for controlling the operations performed by the predefined modules of said item retrieval system, said control unit being adapted to operate under the control of said store control system; and a verification system adapted to operate under the control of said store control system to: verify an identity of said customer or a unique identifier for said order, and allow said customer to access said items in said customer locker compartment only when said identity or said identifier has been successfully verified.

Preferably, the automated retail store system is adapted to make use of an innovative modular storage shelf system, modular item retrieval system, modular customer locker system, robotics, 3D-vision, and backend software to sort, store, retrieve, restock merchandise items as well as to manage inventory of the system.

According to another aspect of the present invention, there is provided a retail site having an automated retail store system as described above.

According to another aspect of the present invention, there is provided a retail management system including:

a processor adapted to communicate with one or more automated retail store system (as described above) by sending control signals and receiving of response signals via a communications network;

wherein said control signals include information for controlling one or more of the operations performed by a particular said automated retail store system; and wherein said response signals includes information representing a state, status or request relating to one or more of the operations performed by said automated retail store system.

According to another aspect of the present invention, there is provided a modular storage shelf unit, comprising:

one or more storage shelf modules;

each said storage shelf module having an internal storage space configured to provide a plurality of storage compartments for storing one or more removable storage containers;

wherein each said storage shelf module is configured according to one of several different predetermined storage shelf module configurations, each said storage shelf module configuration representing a different internal spatial and/or functional configuration of said storage compartments for a said storage shelf module adapted to fit within a floor space area of a predefined size and shape.

According to another aspect of the present invention, there is provided a modular customer locker unit, comprising:

one or more customer locker modules;

each said customer locker module having an internal storage space configured to provide one or more customer locker compartments each for storing a removable storage container, each said customer locker compartment including an access barrier for controlling customer access to the contents of a said storage container stored in said customer locker compartment;

wherein each said customer locker module is configured according to one of several different predetermined customer locker module configurations, each said customer locker module configuration representing a different internal spatial and/or functional configuration of said customer locker compartments.

According to another aspect of the present invention, there is provide a modular item retrieval system, comprising:

a support structure extending upwards from a base;

a drive unit coupled to the base for moving said system relative to a floor surface on which said system is placed;

a control unit for controlling the operations performed by one or more modules of said system; and one or more of the following modules coupled to said support structure:

i) a storage bay module configured according to a selected one of several predetermined storage bay module configurations for storing one or more removable storage containers;

ii) a container handling module configured according to a selected one of several predetermined container handling module configurations, each said container handling module being configured to operate under the control of said control unit to perform predefined container handling operations including retrieving a storage container from a selected retrieval location in three-dimensional space proximate to said system, and moving the retrieved storage container to a selected target position in three-dimensional space proximate to said system; and iii) an item handling module configured according to a selected one of several predetermined item handling module configurations, each said item handling module being configured to operate under the control of said control unit to perform predefined item handling operations including identifying items in a retrieved storage container, retrieving a selected item from the retrieved storage container, and placing the selected item into another storage container proximate to said system;

wherein said drive unit and said control unit are each configured to operate separately and independently of each other under the control of a store control system.

The present invention differs from both the vending machine automated store, and the abovementioned automated retail concept. This present invention requires neither service personnel nor cashiers in the store, the purchase orders are completed by smartphone-related technologies and automation is applied to replace the traditional features of a store.

The present invention is truly unmanned, robotic and internally automated to recognize, sort, refill, re-stock all items into predefined storage containers of predefined shelves. All purchased/ordered items are retrieved from different shelves and are gathered to the customer e-locker using fully automated robotic technology.

On store stock management, the unmanned store periodically performs stock check on all the stock in the system. Items which have expired (or are close to expiry) can be automatically retrieved from shelves to a reject container box automatically.

The automated store inventions described herein start with the concept of retail store and automation. Various retailers have attempted to provide their own versions of automated stores. However, their definition and design of such automated stores are all different, and none of them are designed to perform real "unmanned" operation cycle (e.g. performing store sales and stock management operations in an automated or autonomous manner without requiring regular human monitoring, input or control). The inventions described herein provide solutions that enable fully automated store operation cycle from sale of products, store replenishment of products, item checked-out, and payment. Certain aspects of the invention also address problems with item retrieval and delivery in existing system through application of a unique and specially designed modular Autonomous Mobile Robot (AMR).

The inventions described herein also aims to solve various problems associated with existing automated store solutions, such as: (i) inability to ensure freshness of items being sold (e.g. fresh groceries or other perishable items); (ii) lack of focus on customer/user experience; and (iii) high investment cost to setup or maintain an automated store.

In relation to freshness (or ensuring minimal degradation) of items being sold, it is important to note that fresh food accounts for a significant proportion of sales in the grocery industry. However, most typical automated stores are not designed to appropriately store and sell fresh food or products with a short shelf life or even instant cooked food. Providing fresh products is important to satisfying genuine customer needs. The inventions described herein can provide a temperature-controlled delivery operation cycle. According to one aspect of the invention, a temperature-controlled cart provides an enclosed and protective storage environment for the transportation of items (particularly perishable or temperature-sensitive items) from a point of origin (e.g. a temperature controlled room in a packing or distribution warehouse) to a destination (e.g. an automated store). The cart provides different storage zones that can be separately customised or configured to provide different storage environments (e.g. in terms of different storage temperatures, air flow, physical item protection etc.) to ensure that items within the cart are stored under appropriate conditions to help ensure its freshness (or minimising changes to its state) during the transportation process. Upon arrival at an automated store, temperature-controlled carts are moved into a replenishment zone where item retrieval systems (e.g. AMR) transports containers containing the transported items to appropriate storage shelf locations within the automated store. The storage shelf locations can be separately customised or configured to provide different storage environments (e.g. in terms of different storage temperatures, air flow, physical item protection etc) to ensure that items within the cart are stored under appropriate conditions to help ensure its freshness (or minimising undesirable changes to its storage state). Alternatively, the storage shelf locations can be located in different temperature-controlled zones (or rooms) that provide different appropriate storage environments for such items. In this way, temperature-sensitive or perishable items can be stored in an appropriate or optimum storage environment to ensure freshness (or minimise degradation) of the items prior to sale. For example, an automated store incorporating inventive features as described herein can be used to store and sell fresh food with short expiry day, and even hot lunch boxes or instant cooked food that may need to be stored in relatively higher temperature environments.

In relation to focus on customer or user experience, existing automated stores try to automate specific aspects of store functionality or store operational processes mainly to achieve cost savings, but this often neglects important human considerations essential to providing an effective and satisfying online or automated shopping experience. For example. elderly customers or customers with physical disabilities will have vastly different needs to that of a typical customer. The inventions described herein include features aimed at providing the best service to customers. This includes features focusing on the ergonomic needs of different types of customers, and features aimed at minimizing waiting time. Such aspects of an automated store can be configured based on independent profile data for each user, or profile data developed to serve particular types of customers with specific (e.g. physical) needs. Operational efficiency and customer experience can be improved by allowing customers to pick up their order items at a specified pick up time to avoid waiting, where the automated store is configured to fulfil such orders in a "just in time" manner to ensure the ordered items are stored in their optimal storage environment for as long as possible, but ensure that the ordered items are ready for the customer by the specified pick up time. The automated store invention described herein also provides high flexibility to adapt variance in different shops, for example, including the ability to change the setup of a store accordingly to take care of customer experience by adapting their shopping habits, cultures and trendy products.

In relation to setup or maintenance costs, setting up a traditional automated store is a complicated process. Besides the high initial investment cost, the setup process typically requires highly skillful automation specialists and experts to install, calibrate and test the relevant systems. There are often many limitations in the setup process. For example, the machines used in an automated store are typically large and heavy, with substantial constraints on customisation. This can make it difficult to install such machines into stores with a floor space that is relatively small or of irregular shape. The automated store solution described herein include the modular design of certain components and machines (such as for storage shelves, customer locker compartments, and item retrieval systems) which are easy to setup, configure and repair/replace. This simplifies the setup/maintenance process and costs in that such equipment can be fitted and configured by fitting out companies without necessarily involving automation specialists or experts. The systems or components of the invention based on modular design can be pre-assembled in a factory to shorten the setup time. Such components can be configured in an agile and flexible way, and can be installed in shop with floorspace of any size and/or shape. Furthermore, such components can be quickly changed with ease, which helps make setup and maintenance of an automated store fast, cheap and easy.

BRIEF DESCRIPTION OF THE DRAWINGS

Representative embodiments of the present invention are described herein, by way of example only, with reference to the accompanying drawings, wherein.

DETAILED DESCRIPTION OF THE REPRESENTATIVE EMBODIMENTS

Figure 1:
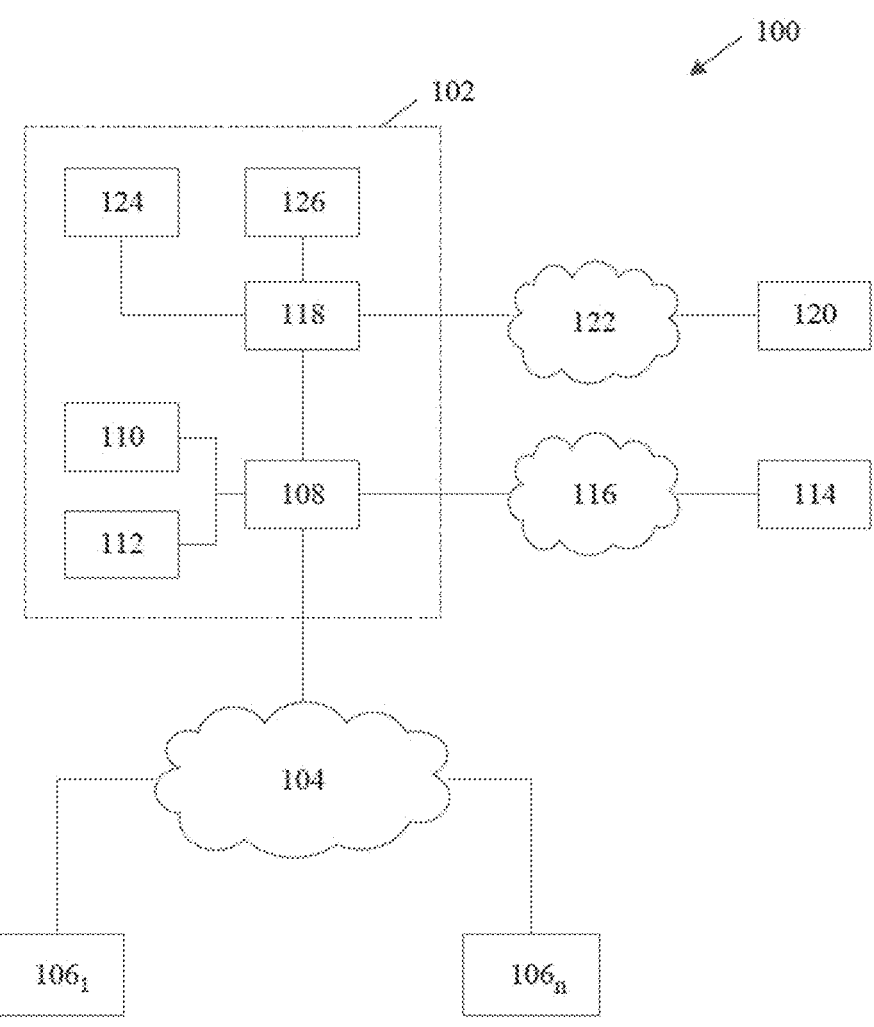
FIG. 1 is a block diagram of a retail system including a retail management system for controlling a plurality of automated retail store systems.

FIG. 1 is a block diagram of a retail system 100 according to a representative embodiment of the present invention. The retail system 100 comprises of a retail management system 102 that communicates with and controls one or more automated retail store systems $106_1$ to $106_n$ over a communications network 104. Each automated retail store system 106 is setup at a single retail site and may be configured to operate as a single autonomous automated store. Preferably, each retail site is at a different location that is physically spaced apart from each other. A retail site refers to a physical location at which items from a single automated retail store system 106 can be purchased and retrieved. For example, a single automated retail store 106 may be configured to operate within a predefined retail space (such as the space in commercial premises that can be used to operate a traditional shop or store). The physical components of each automated retail store system 106 can be configured to maximise the use of such retail space.

In this specification, a communications network (e.g. 104, 116, 122) refers to any means of wired or wireless data communications between two or more electronic devices (e.g. between the retail management system 102 and automated retail store system 106). For example, the communications network 104 may include one or more of a public network (e.g. the Internet), a private network (e.g. a virtual private network), a wide area network (WAN), public switched telephone network (PSTN), a mobile telecommunications network (e.g. a GSM™, CDMA™, UMTS™, LTE™, LTE-A™ network), and a direct physical connection or communications channel that enable data communications between different electronic devices. In FIG. 1, items 104, 116, 122 may refer to different communications networks, or to different communication paths over the same communications network.

According to one aspect of the present invention as shown in FIG. 1, there is provided a retail management system 102 configured for receiving customer orders via a communications network. The retail management system 102 is also configured for controlling one or more automated retail store systems 106 to fulfil such customer orders in the manner described below.

According to a representative embodiment of the invention as shown in FIG. 1, the retail management system 102 may include the following components: an automated retail store management system 108, an inventory material exchange system (IMAX) 110, an order information exchange system (OIX) 112, one or more courier client devices 114, an online shopping platform 118, one or more customer client devices 120, a user management system 124 and an electronic payment system 126. These components may be configured to implement one or more of the following features described below according to different exemplary aspects of different representative embodiments of the present invention.

According to one exemplary embodiment, the retail management system 102 includes an online shopping platform 118 that is configured to provide an online store (or online ordering system). The online shopping platform 118 includes a content management system (CMS) (including a management platform) for providing an online store from which customers can browse items that customers can order from the online store, and browse sales promotions relating to one or more of such items. The online shopping platform 118 communicates with one or more customer client devices 120 (e.g. a personal electronic device such as a mobile phone, computing tablet or personal computer) which a customer uses to interact with the online shopping platform 118. A customer may control an application (e.g. an online shopping application or web browser) on the customer client device 120 to view and order items from the online shopping platform 118. For example, this may involve the customer providing user input to the application on the customer client device 120 for requesting information on one or more items from the online shopping platform 118. The online shopping platform 118 is configured to respond such a request by providing item information to the application, which the application uses to generate a user interface display on the customer client device 120 to present information on the one or more requested items that can be ordered via the online shopping platform 118. The application on the customer client device 120 is configured to receive further user input from the customer representing a selection of one or more items that the customer wishes to order using the online shopping platform 118. Such items can be items from either a specific automated retail store system 106 that is adapted to store a variety of different items and/or from a network of one or more supply warehouses or physical retail stores (together referred to as the supply warehouse) from which such the ordered items can be shipped.

In the context of the present invention and this specification, an item refers to any physical object that can be ordered from an automated retail store system 106. For example, an item could be any consumable product that is independently packaged as a single unit that can be individually transported, retrieved and/or dispensed (e.g. a carton of milk, a canned beverage, a bag of rice, etc.). In the context of the present invention, an order represents a set of one or more items that a customer has selected and purchased using the online shopping platform 118. Items of the same type or description have the same basic characteristics (e.g. in terms of the nature of the product, brand, manufacturer, packaging size or configuration, etc.). Items of the same type or description are preferably associated with the same unique item type identifier (e.g. a Stock Keeping Unit (SKU) identifier).

According to one representative embodiment of the invention, in the process of the customer placing an order via the online shopping platform 118, the customer may select to browse items and/or order items only from a selected automated retail store system 106. In such a scenario, the online shopping platform 118 may be configured to perform a stock availability checking process to determine the items and their current quantities available at the selected automated retail store system 106. The online shopping platform 118 may be configured so that (based on the stock availability checking process) customers can only order quantities of items that are actually available at the selected automated retail store system 106. For example, if the selected automated retail store system 106 has only six units of a particular item, the combined orders from one or more customers for that item from the selected automated retail store 106 must not exceed six units for that particular item. Preferably, the stock availability checking process is performed when the online shopping platform 118 generates and provides item information in response to a request (e.g. from a customer client device 120) for information on one or more items from the online shopping platform 118. The stock availability checking process may be performed during (or at any time before) a customer attempts to add a selected quantity of a selected item to the customer's order. The online shopping platform 118 will require the customer to provide a pickup time at which the customer will retrieve the ordered items from the selected automated retail store 106.

Alternatively, according to another representative embodiment, the online shopping platform 118 may be configured such that customers are not limited to ordering quantities of items that are actually available at the selected automated retail store system 106 at the time of placing the order. Instead, the combined orders from customers for a particular item from the selected automated retail store system 106 may exceed the actual quantity of such item at the selected automated retail store system 106. The online shopping platform 118 may be configured to perform a stock availability checking process as described above. If the online shopping platform 118 receives a customer's order where the required quantity for an ordered item exceeds the actual quantity of that item at the selected automated retail store system 106 (e.g. determined by the stock availability checking process), the online shopping platform 118 may be configured to retrieve a restocking time estimate (e.g. generated by the automated retail store management system 108) representing an estimated amount of time required for restocking at least the required quantity of the ordered item to the selected automated retail store system 106. The online shopping platform 118 may be configured to perform a pickup time checking process to determine whether the pickup time provided by the customer would occur before the time required to restock at least the required quantity of the ordered item to the selected automated retail store system 106, and if so, the online shopping platform 118 may be configured to prompt the customer to select a later pickup time.

According to yet another representative embodiment of the invention, in the process of the customer placing an order via the online shopping platform 118, the customer may browse and/or order any items available via the online shopping platform 118 (i.e. not limited to items available from any particular automated retail store system 106). The online shopping platform 118 may be configured to perform a stock availability checking process to determine the items and their current quantities available at the supply warehouse. In such a scenario, the online shopping platform 118 is configured so that the quantities of items that can be ordered correspond to the quantities of those items actually available from the supply warehouse.

According to yet another representative embodiment of the invention, in the process of the customer placing an order via the online shopping platform 118, the customer may order items using an approach described in any one or more of the above representative embodiments. For example, some of the ordered items (e.g. items which a customer requires urgently) may be ordered for pickup from a selected automated retail store system 106, while the remaining ordered items (e.g. less urgent or bulky items) are ordered for delivery from the supply warehouse to the customer.

In the above scenarios, the stock availability checking process involves the online shopping platform 118 communicating with the automated retail store management system 108 to determine (e.g. based on stock data retrieved from the IMAX 110) a quantity of a selected item that is currently available at a selected automated retail store system 106 or in the supply warehouse. The IMAX 110 includes a database that stores stock data representing a currently available quantity (e.g. number of units) of each item at a particular supply location (e.g. an automated retail store system 106 or the supply warehouse). Preferably, each item is represented by a unique item identifier (e.g. item number). Preferably, each supply location is represented by a unique store or location identifier (e.g. a store number). The IMAX 110 manages the inventory of items in each of the automated retail stores system 106 and also the inventory items in a network of one or more supply warehouses or physical retail stores (collectively referred to as a supply warehouse). The automated retail store management system 108 communicates with the IMAX 110 to send and receive stock movement information of inventory from all (or at least one or more of) the automated retail store systems 106 of the retail system 100.

In the process of placing an order using the online shopping platform 118, the customer uses a customer client device 120 to select one or more items to be ordered, which are temporarily added to a virtual shopping cart such that the selected items are associated with a unique identifier for the customer's order. Once a customer has finished selecting the items to be ordered, the online shopping platform 118 generates and transmits order information to the automated retail store management system 108. Preferably, the order information for each customer order includes one or more of the following:

(i) a unique item identifier and a required quantity for each item in the order;

(ii) a unique store identifier for a selected automated retail store system 106 that is associated with any of the items in the order that are ordered from the selected automated retail store system 106 (e.g. if the customer has indicated they would like to pick up ordered items from the selected automated retail store system 106);

(iii) a pickup time associated with the order (e.g. if the customer has indicated they would like to pick up ordered items from the selected automated retail store system 106);

(iv) customer identification information (e.g. a user id); and (v) a unique identifier associated with the order (e.g. order number).

Preferably, according to one representative embodiment, any items in the order that are associated with a unique store identifier are treated as an order for items from the selected automated retail store system 106 associated with that unique store identifier. This association is determined based on customer input provided in the process of the customer placing an order via the online shopping platform 118. The selected automated retail store system 106 will retrieve such ordered items before the pickup time, an example of which will be described in more detail below.

Preferably, according to one representative embodiment, any items in the order that are not associated with a unique store identifier are treated as an order for items from the supply warehouse. This is also determined based on customer input provided in the process of the customer placing an order via the online shopping platform 118. Such items will be fulfilled by the supply warehouse and shipped to a delivery location specified by the customer.

The online shopping platform 118 communicates with the user management system 124 to carry out a customer verification process. According to one representative embodiment of the invention, this verification process preferably begins by the online shopping platform 118 providing the customer identification information (e.g. a unique user identification number obtained based on input from the customer and/or information received from a customer client device 120 controlled by the customer) to the user management system 124 to verify an identity of the customer. The verification process may request further verification information from the customer (e.g. ask the customer to provide a username and/or password associated with the user identification number, request the customer to provide a confirmation code sequence or click on a verification URL link that has been separately sent to a previously verified email address or mobile phone number of the customer). Once an identity of the customer has been verified, the online shopping platform 118 communicates with the customer client device 120 to obtain payment information from the customer for the ordered items. The customer may provide payment information (e.g. credit card number) via the customer client device 120, or alternatively, direct the online shopping platform 118 to retrieve such payment information stored as part of a user profile in association with the customer's identification information. The online shopping platform 118 then communicates with the electronic payment system 126 to process the customer's payment information for the items ordered.

According to one representative embodiment of the invention, after the electronic payment system 126 has successfully processed the customer's payment information for the order, the online shopping platform 118 sends the order information to the automated retail store management system 108 to process the order. The automated retail store management system 108 provides centralised control of all (or at least one or more of) the automated retail store systems 106 of the retail system 100. The automated retail store management system 108 is configured to perform one or more of the following operations: (i) analyse order information received from the online shopping platform 118; (ii) generate, based on the order information received, control data and/or signals representing one or more executable jobs for each automated retail store systems 106; (iii) calculate the restock quantities and schedules for all (or at least one or more of) the automated retail store systems 106 of the retail system 100; (iv) serve as a communications bridge between the automated retail store systems 106 of the retail system 100 and any outside systems.

If the automated retail store management system 108 determines that the received order information for a customer's order includes one or more ordered items to be picked up from a selected automated retail store system 106, the automated retail store management system 108 generates (based on the order information) control data and/or signals representing one or more control messages for controlling one or more operations performed by the selected automated retail store system 106. Each control message includes information representing one or more predefined executable jobs, where each executable job refers to a set of one or more instructions and/or control signals for controlling the operation(s) of one or more internal components of the selected automated retail store system 106 to perform a predetermined task (or alternatively, a predetermined sequence of multiple predetermined tasks). For example, an executable job may include instructions and/or control signals for controlling a store control system 500 to perform one or more of the following control activities:

a) Control a control module 506 of an item retrieval system 312 to detect a level or quantity of items present in a specific storage container 800 in a storage shelf module (e.g. 310a, 310b). If the detected level or quantity is below a predetermined threshold level or quantity, the store control system 500 generates another executable job for an item retrieval system 312 to either: (i) replenish the relevant items in the relevant specific storage container 800 with the same or equivalent items stored in a replenishment system 318; or (ii) replace the relevant specific storage container 800 with another storage container 800 containing the same or equivalent items stored in a replenishment system 318.

b) Control a control module 506 of an item retrieval system 312 to retrieve one or more items in a customer order from a specific storage container 800 in a specific storage shelf module (e.g. 310a, 310b). The storage shelf module (e.g. 310a, 310b) may be located in the ambient temperature storage zone 302 or temperature-controlled storage zone 304.

c) Control a control module 506 of an item retrieval system 312 to place retrieved items for a customer order into either: (i) a specific customer locker compartment 1502 of a specific customer locker module/unit 1500, or (ii) a specific customer storage compartment 1504 of a specific customer locker module/unit 1500. Such control action may be performed by the store control system 500 based on control data, information or signals provided by a control module 504 of the specific customer locker module/unit 1500 (e.g. based on an availability status of customer locker compartments 1502 and/or customer storage compartments 1504 in that customer locker module/unit 1502).

d) Control a control module 506 of an item retrieval system 312 to place retrieved items for a customer order from a specific customer locker compartment 1502 of a specific customer locker module/unit 1500 to a specific customer storage compartment 1504 (or vice versa). Such control action may be performed by the store control system 500 based on control data, information or signals provided by a control module 504 of the specific customer locker module/unit 1500 (e.g. based on an availability status of customer locker compartments 1502 and/or customer storage compartments 1504 in that customer locker module/unit 1500).

e) Control a control module 504 of a customer locker module/unit 1500 to control a state of an access barrier 1506 of a specific customer locker compartment 1502 to allow a customer access to the contents of that customer locker compartment 1502 after successful verification of the customer.

The automated retail store management system 108 sends the generated one or more control messages to the selected automated retail store system 106 identified in the order information. The store control system 500 of the selected automated retail store system 106, in response to receiving the order information, controls the operation of one or more internal components of the selected automated retail store system 106 to perform one or more specific actions (e.g. mechanical actions, receive sensor data input etc.) corresponding to each predetermined task in each executable job. For example, based on the control message(s) received, the selected automated retail store system 106 may be controlled to retrieve the items identified in the order information and place the retrieved items into one or more delivery containers for the customer to pickup from the selected automated retail store system 106 before (e.g. by or within a predetermined period of time before) the pickup time indicated in the order information.

According to one representative embodiment of the invention, the automated retail store management system 108 may determine (e.g. based on stock data received from the IMAX 110 and/or response messages received from the store control system 500 of a selected automated retail store system 106) whether a selected automated retail store system 106 does not have all of the ordered items, or does not have sufficient quantities of one or more ordered items, or request one or more items to be restocked in the system 106 (i.e. shortfall items). Based on the above data/messages, the automated retail store management system 108 determines an availability of one or more of such shortfall items from an alternative supply location such as the supply warehouse and/or from one or more other automated retail store systems 106 proximate to (e.g. with a predetermined travel time or travel distance from) the selected automated retail store system 106.

For example, according to a representative embodiment of the invention:

a) If the automated retail store management system 108 determines that one or more of the shortfall items are available from the supply warehouse, the automated retail store management system 108 determines a time period for retrieving the shortfall items from the supply warehouse and for a courier to deliver such shortfall items (in a replenishment system 318) to the replenishment zone 308 of the selected automated retail store system 106.

b) If the automated retail store management system 108 determines that one or more of the shortfall items are available from one of the proximate automated retail store systems 106, the automated retail store management system 108 determines a time period for retrieving the shortfall items from that location and for a courier to deliver such shortfall items (in a replenishment system 318) to the replenishment zone 308 of the selected automated retail store system 106.

c) If the automated retail store management system 108 determines that one or more of the shortfall items are all available from one or more of the proximate automated retail store systems 106 (preferably prioritising proximate automated retail store systems with the least travel distance to the selected automated retail store system), the automated retail store management system 108 determines a time period for retrieving assigned quantities of the shortfall items from those locations (which together make up the quantity of the shortfall items in the order) and for a courier to deliver such shortfall items (in a replenishment system 318) to the replenishment zone 308 of the selected automated retail store system 106.

d) If the automated retail store management system 108 determines that one or more of the shortfall items are all available from the supply warehouse and one or more of the proximate automated retail store systems 106 (preferably prioritising proximate automated retail store systems with the least travel distance to the selected automated retail store system), the automated retail store management system 108 determines a time period for retrieving assigned quantities of the shortfall items from those locations (which together make up the quantity of the shortfall items in the order) and for a courier to deliver such shortfall items (in a replenishment system 318) to the replenishment zone 308 of the selected automated retail store system 106.

The automated retail store management system 108 then selects one or more of the above delivery options (a), (b), (c) or (d) that can deliver the shortfall items to the selected automated retail store system 106 before the pickup time in the order information. The automated retail store management system 108 then further selects one or more of the selected delivery options based on predetermined criteria (e.g. based on item availability in, delivery time from, and/or travel distance from the alternative supply location for each selected delivery option), and for each delivery option generates suborder information for the supply warehouse and/or the relevant automated retail store system 106 to retrieve the required quantities of the order items to fulfil the customer's order. Each said suborder information may include a scheduled pickup time (set before the pickup time in said order) for a courier to pickup from the alternative supply location the items retrieved based on the suborder information by the scheduled pickup time, and load these items into the selected automated retail store system 106 before the pickup time.

The automated retail store management system 108 also generates delivery instructions that are transmitted to a courier client device 114. The delivery instructions configure the courier client device 114 (e.g. through a courier application installed on the courier client device 114) to display delivery information for a courier to pickup the shortfall items from the locations identified in selected delivery option, and deliver these items to the selected automated retail store system 106 before the pickup time in the order information selected by the customer.

If the automated retail store management system 108 determines (e.g. based on stock data for a particular item received from the IMAX 110, and/or response messages received from a selected automated retail store system 106 representing a restock request for one or more specific item(s) or indicating a quantity of a specific item in that store system 106) that a quantity of any particular item at the selected automated retail store system 106 is less than a predetermined threshold stock level for that item, the automated retail store management system 108 generates and sends to the supply warehouse a restock request message containing restock order information representing one or more items (and a restocking quantity for each such item) for restocking the selected automated retail store system 106. For example, the threshold stock level may be a predetermined quantity of an item (e.g. a minimum number of units or percentage of stock) that should be available at the selected automated retail store system 106. The restocking quantity of an item may be determined based on information obtained from the IMAX 110, such as a current quantity of that item available at the selected automated retail store system 106 and/or a predetermined (e.g. maximum) quantity of that item which can be stored at the selected automated retail store system 106. Preferably, the automated retail store management system 108 determines whether restocking of any items at a selected automated retail store system 106 is required (in the manner described above) on a periodic basis (e.g. on a daily or weekly basis or according to a predetermined schedule).

When the supply warehouse is ready to deliver the items specified in a restock request message (referred to as restock items) to the selected automated retail store system 106, the supply warehouse updates the information stored in the OIX 112 to include details of the restock items delivered from the supply warehouse to the selected automated retail store system 106 (referred to as a restock delivery).

The automated retail store management system 108 may generate restocking instructions that are sent to the courier client device 114 of a courier assigned to deliver the restock items to the selected automated retail store system 106. The restocking instructions may include: (i) delivery information for configuring a user interface of a courier client device 114 (e.g. through a courier application installed on the courier client device 114) to display directions or instructions for a courier to pickup and deliver specific restocking items to the selected automated retail store system 106; and/or (ii) item organisation information for configuring a user interface of a courier client device 114 (e.g. through a courier application installed on the courier client device 114) to display to the courier directions or instructions for preparing or reorganising one or more of the items being delivered for restocking the selected automated retail store system 106. For example, if the OIX 112 indicates that a restock delivery includes two 6-packs of soft drink, but the selected automated retail store system 106 only requires 8 units of the soft drink to be restocked, the reorganised item information (in this example) could include directions or instructions for the courier to disassemble the two 6-packs of soft drink and only provide the required number of units for restocking that item at the selected automated retail store system 106. The item organisation information for each item in a restock delivery may be generated based on a quantity of that item at the selected store system 106 (obtained from the IMAX 110) and the quantity and packaging of the restock items being delivered to the selected automated retail store system 106 in a restock delivery (obtained from the OIX 112).

The courier application on the courier client device 114 also provides an interface for providing the one or more of the following kinds of instructions to a courier (e.g. based on information from the automated retail store management system 108, IMAX 110 and/or OIX 112): (i) sorting and/or organising the restock items in different delivery or restocking containers; (ii) remote control to operate an access barrier (e.g. a door) to a locker compartment at an automated retail store system 106; and (iii) to retrieve containers (e.g. delivery containers, restocking containers, reject containers, etc.) and items from an automated retail store system 106 back to the supply warehouse.

The courier application can interact with different systems of the retail management system 102 as follows: (i) receive, from the automated retail store management system 108, restock order information to execute a restock delivery; (ii)

send reorganised item information to the automated retail store management system 108 for updating the IMAX 110 (where the courier provides reorganised item information representing a quantity or number of units of each restock item actually provided to restock a particular automated retail store system 106); (iii) send instructions to the automated retail store management system 108 for operating an access barrier of an automated retail store system 106; and (iv) receive instructions from the automated retail store management system 108 to return containers and related items to the warehouse.

According to one representative embodiment of the invention, if the automated retail store management system 108 receives a request from a specific automated retail store system 106 to restock a particular item, or determines that after fulfilling a particular customer order a particular item in a specific automated retail store system 106 will need to be restocked, the automated retail store management system 108 sends a restock request message to the supply warehouse representing one or more items to be restocked.

Preferably, when the supply warehouse receives a restock request message from the automated retail store management system 108, the supply warehouse arranges the purchase of additional items for the supply warehouse, or to retrieve existing items stored in the supply warehouse corresponding to the items identified in the restock request message. The automated retail store management system 108 manages the restocking of items for each automated retail store system 106 based on information received from the OIX 112. The OIX 112 communicates with an inventory management system of the supply warehouse and provides an interface for the automated retail store management system 108 to receive updates on status of items identified in the restock message that have been ordered. The OIX 112 may generate and send a restock response message to the automated retail store management system 108 based on the restock order information (e.g. setting out the items in the restock request message that have been ordered or retrieved, delivery dates of ordered items, etc.). The OIX 112 may generate and send a response message to the automated retail store management system 108 when the items in the restock request message have arrived (or have been retrieved) and are ready for delivery to a specified automated retail store system 106. The automated retail store management system 108, in response to receiving such a restock response message from the OIX 112, may then generate delivery information that are transmitted to a courier client device 114. The delivery information configures the courier client device 114 to display delivery directions or instructions for a courier to pickup the items to be restocked from the supply warehouse and deliver to a specified automated retail store system 106.

Preferably, the automated retail store management system 108, IMAX 110, OIX 112, online shopping platform 118, user management system 124, electronic payment system 126 and store control system 500 may each be implemented by one or more data processing or control components on separate servers, or on the same server. Each such component may be implemented either in the form of: (i) one or more software modules corresponding to a set of computer-readable instructions stored in memory 206 for controlling the operation of a processor 204 to implement methods and processes according to the present invention; or (ii) data processing circuitry/components (e.g. a microcontroller, ASIC or FPGA) adapted to implement methods and processes according to the present invention; or (iii) a combination of software modules and data processing circuitry/ components as described above that work in cooperation with each other to implement the methods and processes according to the present invention.

Figure 2:
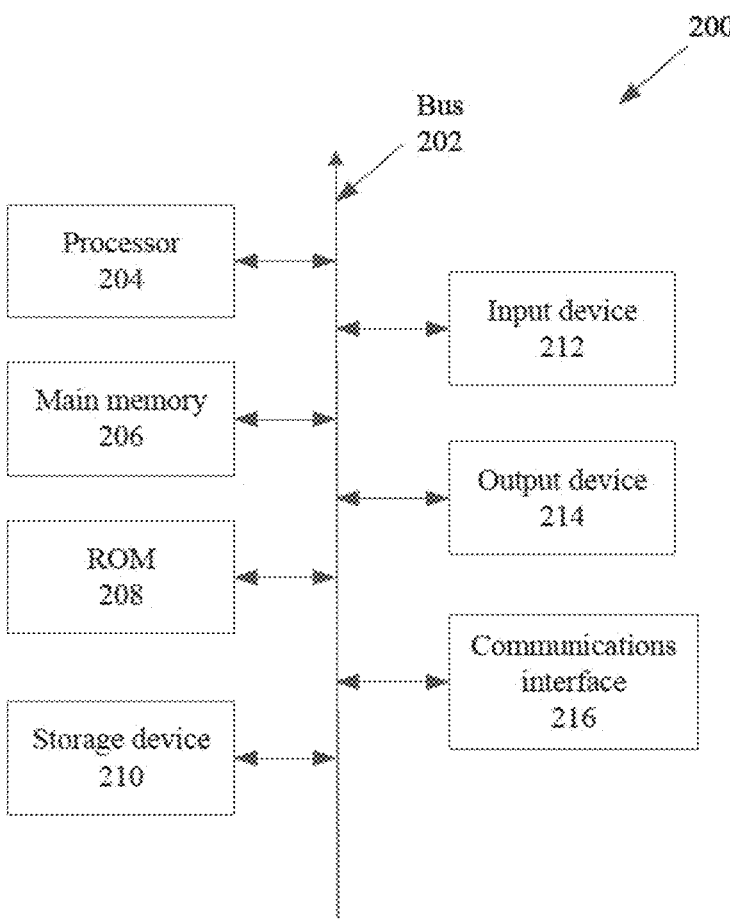
FIG. 2 is a block diagram illustrating an exemplary internal structure of a computer that can be used to implement one or more of the features of the present invention.

A server refers to a dedicated computer (e.g. with an exemplary internal structure as shown in FIG. 2) that is adapted to handle significant volumes of data processing and exchange between internal components of the computer as well as with other devices or clients (e.g. 114, 120) or systems (e.g. 106) over a communications network 104, 116, 122.

A server also refers to a plurality of dedicated computers (as described above) that are adapted to communicate with each other and work together as a single apparatus. A server includes suitable operating system software (e.g. Microsoft™ Windows Server™. Ubuntu™, Red Hat™ Enterprise Linux™, or the like) to handle network communications as well as data communications and coordination between internal components of the server.

A client (e.g. 114. 120) refers to any electronic device that can communicate with a server over a communications network 116/122. For example, a client may include a conventional personal computer (e.g. with an exemplary internal structure as shown in FIG. 2), mobile phone, personal digital assistant, tablet computing device, or a similar or equivalent device. The client includes suitable operating system software (e.g. Microsoft™ Windows™, MacOS™, iOS™, Android™, or the like) to handle network communications as well as data communications and coordination between internal components of the client.

According to one representative embodiment of the invention, the retail management system 102 consists of an automated retail store management system 108 configured to communicate with and control one or more automated retail store systems 106₁ to 106ₙ.

According to another representative embodiment of the invention, the retail management system 102 includes at least one automated retail store management system 108, each configured to communicate with and control a different group of one or more different automated retail store systems 106₁ to 106ₙ. Preferably, the above automated retail store management system 108 is configured to communicate with and control one or both of an IMAX 110 and OIX 112. Preferably, the above automated retail store management system 108 is configured to communicate with one or more courier client devices 114 via a communications network 116.

According to another representative embodiment of the invention, the retail management system 102 (as described above) further includes an online shopping platform 118 that communicates with one or more customer client devices 120 over a communications network 122. Preferably, the online shopping platform 118 is also configured to communicate with a user management system 124 and an electronic payment system 126.

FIG. 2 is a block diagram illustrating an exemplary internal structure of a computer 200, which includes a bus 202, a processor 204, a main memory 206, a read-only memory (ROM) 208, a storage device 210, one or more input devices 212, one or more output devices 214, a communications interface 216. The bus 202 includes one or more conductors for the components of the computer to communicate (e.g. send or exchange data) with each other.

The processor 204 may include one or more conventional microprocessors, microcontrollers, or similar or equivalent data/signal processing components (e.g. an Application Specific Integrated Circuit (ASIC) or Field-Programmable Gate Array (FPGA)) configured to interpret and execute instructions (including in the form of code or signals) provided to the processor 204. The main memory 206 may include a conventional random access memory (RAM) device or another type of volatile data storage device that can store information and instructions for execution by the processor 204. The ROM 208 may include a conventional read-only memory device or another type of non-volatile data storage device that can store information and instructions for execution by the processor 204. The storage device 210 includes any persistent electronic data storage device (e.g. a hard drive), which may comprise of a magnetic, optical or circuit-based data recording medium and any related circuitry and physical components for reading and writing data to/from the recording medium.

The input device 212 may include one or more conventional mechanisms or sensors for a user to input information to, or control the operation of, the processor 204 (e.g. a mouse, keyboard, camera, microphone, etc.). The output device 214 may include one or more conventional mechanisms or sensors for the processor 204 to present information to the user (e.g. a display, printer, speaker, etc.). The communications interface 216 may include any means of data communication from the processor 204 to another device (e.g. a wired or wireless network adaptor card, and/or one or more controllers for controlling different external electromechanical subsystems of the automated retail store system 106 based on sensor input data received from one or more input sensors associated with each subsystem).

Figure 5:
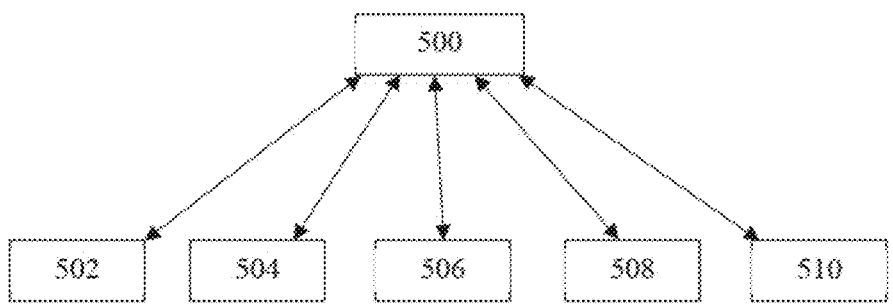
FIG. 5 is a block diagram of control components of the automated retail store system.

Systems/platforms 108, 110, 112, 118, 124, 126 in FIG. 1 and systems/modules 500, 502, 504, 506, 508, 510 in FIG. 5 have their own respective memory or database for storing and retrieving information related the data processing performed by each system. Memory refers to any means of data storage. A database refers to any means of storing and accessing a structured data set, including for example, one or more of the following: a relational database, a distributed database, an object-oriented database, and one or more structured data files (e.g. a Comma Separated Value (CSV) file, Extensible Markup Language (XML) file. JavaScript Object Notation (JSON) format file). The database may be provided either on the server (e.g. as part of the information stored in the storage device 210), or on a separate computing device that the server controls according to a known or predetermined Application Programming Interface (API) or communications protocol.

Figure 3:
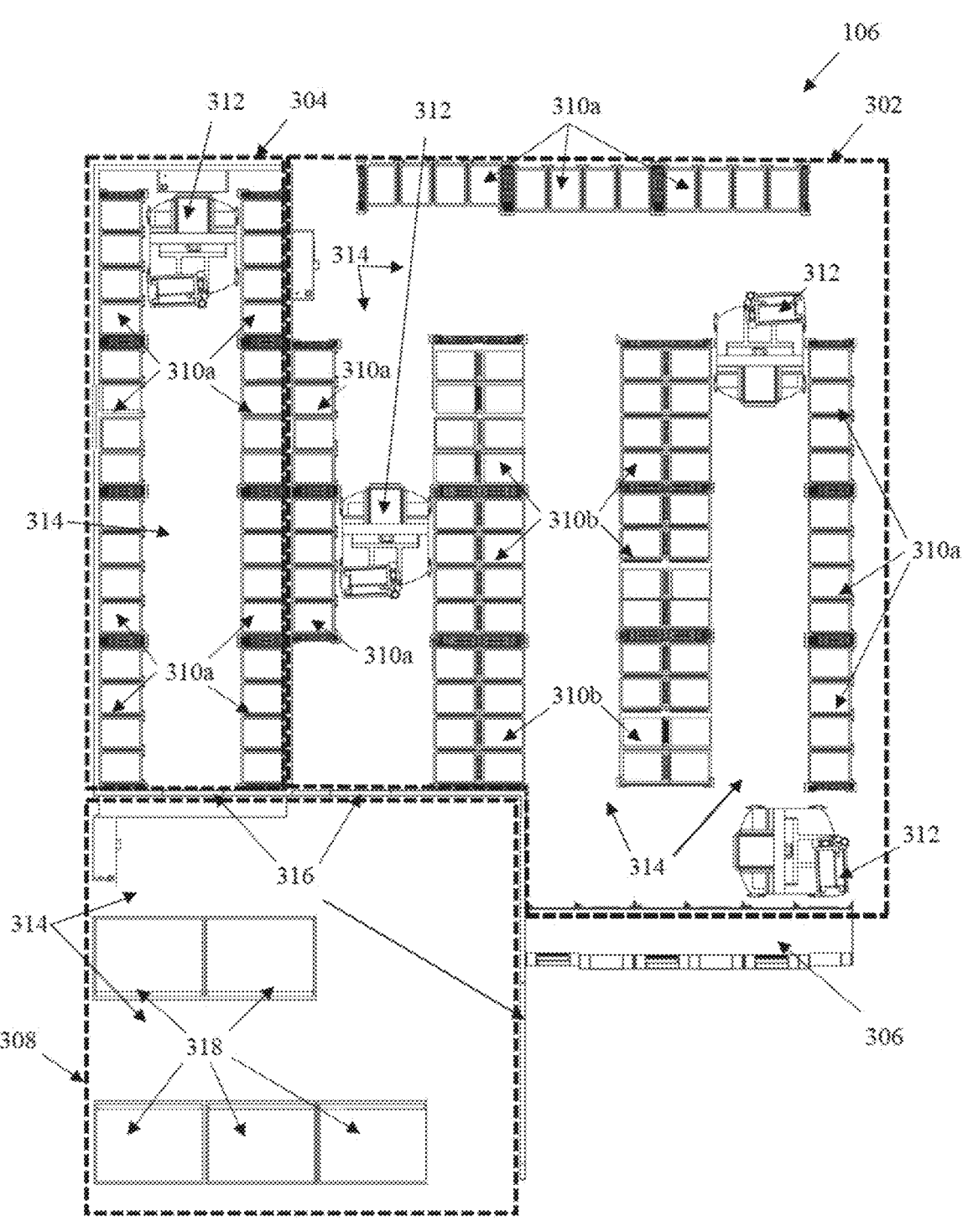
FIG. 3 is a top view of an automated retail store system according to one embodiment of the invention.
Figure 4:
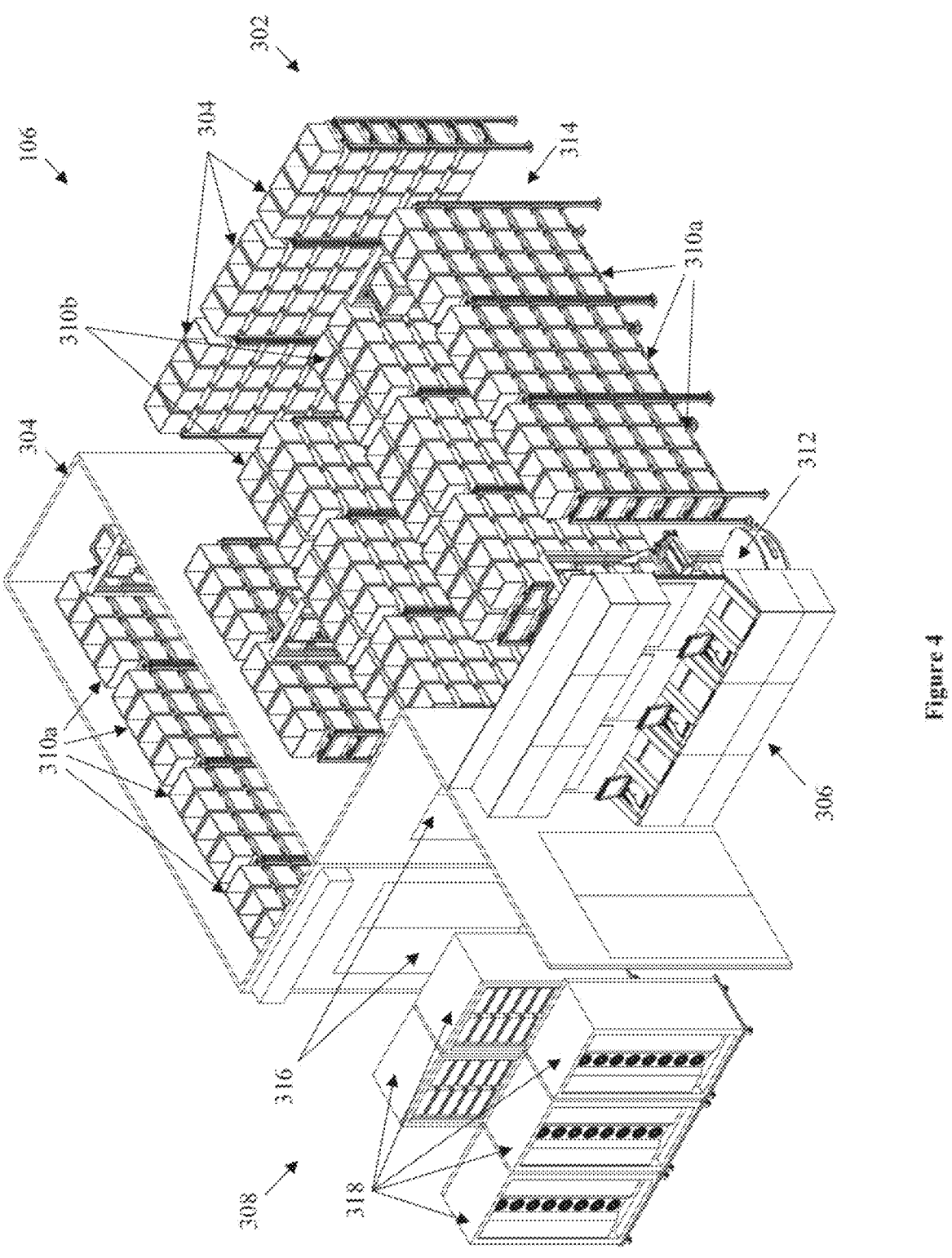
FIG. 4 is a perspective view of the automated retail store system in FIG. 3.

FIG. 3 shows the exemplary internal structure of an automated retail store system 106 according to a representative embodiment of the invention. As shown in FIG. 3, the interior space of the automated retail store 106 is divided into an ambient temperature storage zone 302, a temperature-controlled storage zone 304, a customer interface zone 306, and a replenishment zone 308.

The ambient temperature storage zone 302 contains one or more storage shelf modules (e.g. 310a, 310b). Storage shelf modules of different predetermined size, shape and/or configuration may be provided. Two or more different storage shelf modules (e.g. 310a, 310b) can be coupled together to form a combined storage shelf module of customised size, shape and/or configuration. This is particularly useful if a shelf of particular size or configuration is required for use within a floor space of irregular size or shape. Further features of the storage shelf modules are described in below. Each storage shelf module (e.g. 310a, 310b) is adapted to provide one or more storage compartments, where each storage compartment is capable of storing one or more removable storage containers 800. Each storage container 800 contains items available for sale. Preferably each storage container 800 contain one or more units of the same type of item (e.g. one or more cans of soft drink of the same type or description). Alternatively, a storage container 800 may contain one or more units of different types of items (e.g. one or more cans of soft drink, and one or more cans of canned food or bags of snacks) where different types of items may have different size, shape and/or other physical characteristics.

The temperature-controlled storage zone 304 can be provided in different ways. According to one representative embodiment, the temperature-controlled storage zone 304 is provided by one or more specially configured storage shelf modules (e.g. 310a, 310b) in the ambient temperature storage zone 302. These storage shelf modules (e.g. 310a, 310b) may be configured to provide a plurality of temperature-controlled storage compartments for storing one or more removable storage containers 800. Each temperature-controlled storage compartment may comprise of one or more insulated storage modules. The air temperature within each temperature-controlled storage compartment (or each insulated storage module) is maintained within a predetermined temperature range (which may be higher or lower than ambient temperature) that is suitable for storing the items contained in the storage containers 800 received in the temperature-controlled storage compartment. The air temperature within each temperature-controlled storage compartment may include one or more of the following that can be used for independently monitoring and/or controlling the temperature in a temperature-controlled storage compartment: (i) a temperature sensor module for detecting air temperature within the temperature-controlled storage compartment; (ii) a temperature control module for applying heating and/or cooling to air inside the temperature-controlled storage compartment; (iii) an air circulation module for controlling a flow of air directed into, flowing out from, or flowing within the temperature-controlled storage compartment; and (iv) a control module for controlling the operation of the temperature control module and/or the air circulation module with respect to a particular temperature-controlled storage compartment based on input data or signals received from one or more temperature sensor modules associated with that temperature-controlled storage compartment.

According to another representative embodiment, the temperature-controlled storage zone 304 may be provided as a space (e.g. a room or area) that is separate or isolated from the ambient temperature storage zone 302, such that the air inside the temperature-controlled storage zone 304 is maintained within a predetermined temperature range that is lower than the air temperature in the ambient temperature storage zone 302. For example, the temperature-controlled storage zone 304 may be maintained at a temperature suitable for storing chilled and/or frozen items. Alternatively, the temperature-controlled storage zone 304 may be divided into two separate spaces (e.g. rooms or areas) that are separate or isolated from each other, where the air temperature in a first space is maintained within a first predetermined temperature range suitable for storing frozen items, and the air temperature in a second space is maintained within a second predetermined temperature range suitable for storing chilled items. The temperature-controlled storage zone 304 has one or more storage shelf modules (e.g. 310a, 310b), which may or may not be configured to temperature-controlled storage compartments as described above.

The replenishment zone 308 refers to a space within an automated retail store system 106 for receiving one or more replenishment systems 318. Each replenishment system 318 provides an internal storage space for storing one or more removable storage containers 800. Each replenishment system 318 includes a base with wheel that allows the replenishment system 318 to be moved from one place to another, such as being pushed or moved around by a human operator, through operation of motorised drive means to move the base relative to a floor surface, and/or through physical manipulation by external drive means (e.g. a robotic arm, forklift, or similar external apparatus for moving large or heavy objects). For example, each replenishment system 318 may be provided as a storage cart or trolley. A replenishment system 318 may contain removable storage containers 800 with items that are for restocking storage containers 800 (containing the same items) within a storage shelf module (e.g. 310a, 310b) of the automated retail store system 106. A replenishment system 318 may also contain one or more storage containers 800 that are empty or contain damaged or perished items for removal from the automated retail store system 106. The internal storage space of each replenishment system 318 may be divided into smaller storage compartments, each for storing one or more storage containers 800. Each storage compartment can be separately configured to provide a temperature-controlled storage compartment that is isolated from other storage compartments of the replenishment system 318. Each temperature-controlled storage compartment of the replenishment system 318 may include one or more of the following: (i) one or more temperature control units (e.g. one or more peltier units) for applying heat or cooling to the air within the temperature-controlled storage compartment; (ii) one or more temperature sensors for detecting an air temperature within the temperature-controlled storage compartment; (iii) one or more air circulation units for controlling a flow of air into, or flowing out from, or flowing within the temperature-controlled storage compartment; and (iv) a control unit that communicates with and/or controls the operation of the above components to control the air temperature within the temperature-controlled storage compartment.

The storage shelf modules (e.g. 310a, 310b) and the replenishment systems 318 are placed sufficiently apart to form aisle 314 so that a mobile item retrieval system 312 can move next to them to retrieve or set down one or more storage containers 800 to or from a storage shelf modules (e.g. 310a, 310b) or a replenishment system 318 (or alternatively, retrieve or set down one or more items into a storage container 800 stored in a storage shelf modules (e.g. 310a, 310b) or a replenishment system 318).

The customer interface zone 306 refers to a space within an automated retail store system 106 for customers to retrieve the items they have ordered. The customer interface zone 306 includes one or more customer locker modules 1500. Each customer locker module 1500 can be configured according to any one of one or more predetermined customer locker module configurations. A plurality of customer locker modules 1500 can be coupled together to form a customer locker unit. The customer locker modules 1500 for each customer locker unit may be configured for use as one unit according to any one of one or more predetermined customer locker unit configurations. Each customer locker module/unit 1500 has one or more customer locker compartments 1502, each being adapted to receive a storage container 800 containing items ordered by a particular customer. Each customer locker module/unit 1500 has one or more customer storage compartments 1504, each being adapted to temporarily store a storage container 800 containing items ordered by a particular customer if such items have been retrieved before the pickup time specified by the customer and there is no available customer locker compartment 1502 for receiving such a storage container 800 at the time when such storage container 800 is brought to the customer locker module/unit 1500. Each customer locker compartment 1502 has an access barrier 1506 for controlling access to the contents of the customer locker compartment 1502. The control module 506 controls a state of an access barrier 1506 of a specific customer locker compartment 1502 to allow a customer access to the contents of that customer locker compartment 1502 after successful verification of the customer.

Each automated retail store system 106 includes a store control system 500 and various control modules 502, 504, 506, 508, 510. The store control system 500 serves as a local controller for each automated retail store system 106. A storage shelf control module 502 controls the operations performed by, or in respect of, one or more different storage shelf modules (e.g. 310*a*, 310*b*). A customer locker control module 504 controls the operations performed by, or in respect of, one or more different customer locker modules/ units 1500. An item retrieval system control module 506 controls the operations performed by, or in respect of, a particular item retrieval system 312. An access control module 508 controls an operational state of one or more access barriers 316 to allow or prevent physical access (e.g. by an item retrieval system 312) between different zones (e.g. 302, 304, 308) of an automated retail store system 106. A temperature control module 510 receives data detected by one or more sensors of the automated retail store system 106 (e.g. representing an air temperature within a particular zone 302, 304, 308) and controls the operations performed by, or in respect of, one or more air conditioning units for: (i) applying heating and/or cooling to air inside a particular zone 302, 304, 308; (ii) controlling a flow of air directed into, flowing out from, or flowing within a particular zone 302, 304, 308; and/or (iii) maintaining an air temperature in a particular zone 302, 304, 308 within a temperature range determined for each zone 302, 304, 308.

According to one representative embodiment of the invention, the store control system 500 is implemented on a computer 200 with an exemplary internal structure as shown in FIG. 2, which includes a communications interface 216 configured to communicate with the control modules/units (e.g. 502, 504 506, 508, 510). Each control modules/unit (e.g. 502, 504 506, 508, 510) includes one or more programmable logic controllers (PLC). There are one or more PLCs controlling the actuating components and/or sensors of each electromechanical subsystem (e.g. for 312, 316, 318, 1500) in or used by the automated retail store system 106. For example, each PLC may be pre-configured to control one or more of the actuating components (e.g. motors, robotic arms, etc) and/or sensors of an electromechanical subsystem (e.g. for 312, 316, 318, 1500) to perform one or more specific operations that result in the electromechanical subsystem performing a particular action-for example, control a positioning apparatus (which may include a robotic arm) to move to a certain position in three-dimensional space, control a retrieval apparatus to perform a retrieval action, control a retrieval apparatus to perform a retrieval or release action, etc. The specific operations performed by the actuating components under the control of a PLC may be based on (or in response to) sensor input data received from one or more sensors of a particular electromechanical subsystem. For example, a positioning apparatus may be controlled to move an attached retrieval apparatus to a certain position in three-dimensional space, where fine adjustment of the position of the retrieval apparatus may be controlled based on the analysis of sensor input data representing an image captured from a camera sensor proximate to the retrieval mechanism. For example, the analysis of such sensor input data representing an image may be used to determine the retrieval apparatus's distance from (or position relative to) a target location in three-dimensional space, which is used to control the positioning apparatus and/or retrieval apparatus to make small or incremental adjustments to their respective positions in three-dimensional space to move the retrieval apparatus closer to the target location.

The store control system 500 serves as a communications bridge that allows the automated retail store management system 108 to control and monitor one or more operations or procedures performed by the electromechanical subsystems (e.g. for 312, 316, 318, 1500) of the automated retail store system 106. For example, according to one representative embodiment of the invention, the automated retail store management system 108 may send one or more control messages to the store control system 500 of an automated retail store system 106, where a control message includes information representing one or more executable jobs to be performed by the automated retail store system 106. For each executable job in a control message, the processor 204 of the store control system 500 may generate a sequence of one or more low level instructions, each low-level instruction corresponding to a specific pre-configured action to be performed by an electromechanical subsystem (e.g. for 312, 316, 318, 1500) of the automated retail store system 106 under the control of one or more PLCs. The processor 204 of the store control system 500 then controls the one or more PLCs to perform pre-configured actions based on the sequence of low-level instructions generated by the store control system 500. The PLCs coordinate all the electromechanical devices of each subsystem (e.g. for 312, 316, 318, 1500) to perform the executable jobs and in a manner that ensures the mechanical parts and electromechanical operations performed by the subsystems do not interfere (e.g. obstruct or engage) with each other when performing the executable jobs.

The automated retail store management system 108 may also receive response data and/or signals representing one or more response messages from the store control system 500. A response message for example may include information representing status information associated with an executable job, and/or other signals or information representing an operation state of any component or system of the automated retail store system 106—for example, to provide feedback to the store control system 500 on the execution status of an executable job, generate signals representing a operational status or mechanical condition of different electromechanical components of each subsystem (e.g. for 312, 316, 318, 1500).

According to a representative embodiment of the invention, the store control system 500 of an automated retail store system 106 is configured to receive order information for an order by a customer for items in that store 106. For example, the input device 212 and output device 214 of the store control system 500 may be configured to provide a user interface module through which a customer can access the online shopping platform 118 to browse items and promotions and order one or more such items. The user interface allows customers to order items directly from an automated retail store system 106 instead of using a client device 120. When a customer places an order by providing user input using the user interface module of the automated retail store system 106, the processor 204 of the store control system

500 generates order information that is submitted to the online shopping platform 118. Order information submitted by the store control system 500 is the same as that for orders submitted using a client device 120.

Details on other exemplary aspects of the automated retail store system 106 and retail management system 102 which may form part of different representative embodiments of the invention are described below.

Storage Shelves

Figure 6:
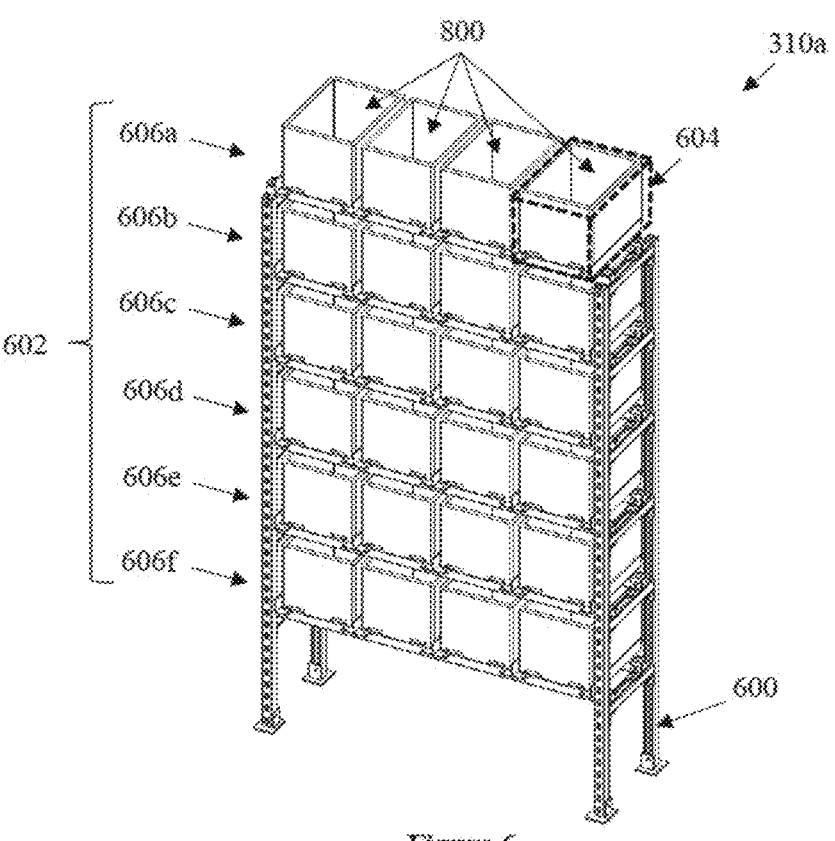
FIG. 6 is an exemplary storage shelf module according to one configuration.

According to one representative embodiment of the invention, FIG. 6 is an example of a storage shelf module 310a configured according to one predetermined storage shelf module configuration, where each shelf layer is configured for storing a first number of storage containers 800 in a m by n configuration, where m and n are both integers each having a value equal to or greater than 1 (e.g. for storing four storage containers a 4-by-1 configuration). According to another representative embodiment of the invention, FIG. 7 is an example of a storage shelf module 310b configured according to another predetermined storage shelf module configuration, where each shelf layer is configured for storing a second number of storage containers 800 in an x by y configuration, where x and y are both integers (different from m and n above) each having a value equal to or greater than 1 (e.g. for storing eight a 4-by-2 configuration).

Figure 7:
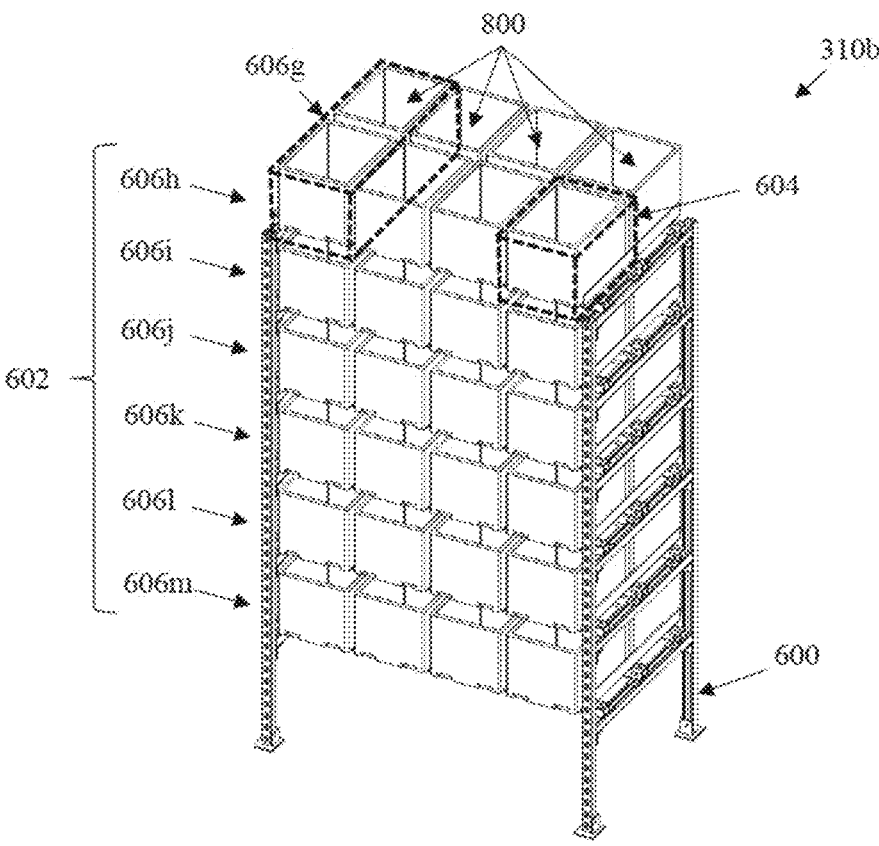
FIG. 7 is an exemplary storage shelf module according to another configuration.

Referring to FIGS. 6 and 7, each storage shelf module (e.g. 310a, 310b) comprises a support structure 600 (e.g. a rigid support frame) that defines an internal storage space 602 comprising at least a vertical stack of storage compartments (e.g. 604, 606a to 606f, 606g, 606h to 606m). Each storage shelf module (e.g. 310a, 310b) has an internal storage space configured to provide a plurality of storage compartments for receiving and removably storing one or more removable storage containers 800. For example, a storage compartment (e.g. 604, 606g) may refer to a space for receiving and removably storing a single storage container 800. Alternatively, a storage compartment can refer to a space (e.g. 606a to 606f, 606h to 606m) for receiving and removably storing a plurality of storage containers 800. The space allocated for one particular storage compartment does not overlap with the space allocated for another storage compartment. For example, a horizontal storage space allocated for storing a first set of one or more storage containers 800 on a particular storage shelf layer may be referred to as a storage compartment (e.g. 606a to 606f, 606h to 606m), and a vertical storage space allocated for storing a second set of one or more different storage containers 800 may be referred to as another storage compartment.

According to one representative embodiment, each storage shelf module (e.g. 310a, 310b) is configured according to one of several different predetermined storage shelf module configurations. Each storage shelf module configuration includes data that defines a unique predetermined combination, arrangement and/or configuration of: (i) one or more storage shelf modules (e.g. 310a, 310b) either individually or in combination as a single unit; (ii) storage space for a storage shelf modules (e.g. 310a, 310b) to store one or more storage containers 800; and/or (iii) any related physical equipment, components and/or sensors for use with a storage shelf modules (e.g. 310a, 310b). For example, a storage shelf module configuration defines how the internal space of the storage shelf module (e.g. 310a, 310b) is divided into discrete and non-overlapping storage compartments. The storage shape module configuration also defines the overall shape, size, internal spatial configuration and/or functionality of (or performed by) each storage compartment, and different such characteristics can be defined for different storage compartments.

Each storage shelf module (e.g. 310a, 310b) can be referred to as a modular storage shelf unit. Alternatively, a modular storage shelf unit can also refer to a combination of one or more storage shelf modules that are coupled together (and configured) as a single unit in a predefined way according to one of several different predetermined storage shelf module configurations. According to one representative embodiment, each modular storage shelf unit is configured according to one of several different predetermined storage shelf module configurations, where each storage shelf module configuration represents a different internal spatial and/or functional configuration of said storage compartments for a storage shelf module (of a modular storage shelf unit) adapted to fit within a floor space area of a predefined size and shape. An advantage of the present invention is that a modular storage shelf unit can be quickly and easily assembled (or quickly and easily disassembled and reconfigured) to fit different floor space configurations and/or functionality requirements based on different predetermined configurations.

According to another representative embodiment, each storage shelf module includes coupling means for releasably coupling with one or more other adjacent storage shelf modules. Coupling means refers to any means of releasably securing two adjacent storage shelf modules together, such as by way of one or more fasteners (e.g. rivets, screws), or any mechanism fitted to corresponding parts of each storage shelf module that can engage with each other to resist detachment of the storage shelf modules, and can disengage with each other to allow separation of the storage shelf modules.

For example, a plurality of storage shelf modules can be securely coupled together to form a customised modular storage unit that is adapted to fit within a floor space area of a predetermined size and shape.

Each storage compartments of each storage shelf module (e.g. 310a, 310b) can be configured according to a predetermined storage shelf module configuration to perform certain specific functions or operations. For example, a storage compartment may be configured into a configuration module that performs certain specific functionality according to a predetermined storage shelf module configuration. A configuration module can be any one or more of the following types of modules:

i) A temperature control module for selectively applying heating and/or cooling to at least a part of the internal storage space of a storage shelf module or modular storage shelf unit.

ii) A temperature sensor module for detecting a temperature in at least a part of the internal storage space of a storage shelf module or modular storage shelf unit.

iii) an air circulation module for selectively controlling a flow of air into, flowing out from or flowing within the internal storage space of a storage shelf module or modular storage shelf unit. For example, the air circulation module may control a flow of air external to the storage shelf module into the internal storage space, and/or control a flow of air from the internal storage space to a space external to the storage shelf module.

iv) A control module for controlling an operation of a temperature control module, temperature sensor module and/or an air circulation module (as described above);

v) An insulated storage module providing an insulated storage environment for storing one or more storage containers 800. The insulated storage module may comprise of barrier members (e.g. walls) that define an enclosed storage space for receiving one or more storage containers 800, where access to the enclosed storage space is controlled by an access barrier (e.g. door), and when the access barrier is closed, the enclosed storage space is completely isolated from an external environment external to the barrier members. Preferably, the barrier members are made from a temperature insulating material to resist any changes in temperature of the external environment from affecting a temperature inside the enclosed storage space.

vi) A physical barrier module for providing physical separation between adjacent storage compartments of a storage shelf module or modular storage shelf unit.

vii) A rail support module for supporting one or more storage containers 800 received in a storage compartment of a storage shelf module or modular storage shelf unit. For example, a rail support member may be provided on a bottom portion of each storage compartment to reduce friction (and therefore improve ease of movement) between a storage container 800 and bottom portion of the storage compartment.

Each configuration module includes coupling means for releasably coupling the configuration module to a part of the internal support structure of a storage shelf module. For example, each configuration module may include coupling means for releasably coupling the configuration module to a part of a modular support structure for a single said storage compartment.

As shown in FIGS. 6 and 7, each said storage shelf module includes an internal support structure 600 defining one or more storage layers within the internal storage space 602. For example, the storage layers being arranged one on top of another, wherein each storage layer is configurable (according to one of several different predetermined storage shelf module configurations) to provide one or more storage compartments.

According to a representative embodiment of the invention, the internal support structure 600 comprises of a combination of separate modular support structures coupled together, where each modular support structure (together in combination) defines a storage space for a single storage space that is divided into respective storage compartment.

As shown in FIG. 3, according to one representative embodiment, the storage shelf modules (e.g. 310a, 310b) (either alone or combined as storage shelf units) are preferably arranged longitudinally in several rows that are spaced apart from each other to provide an aisle between them. Preferably, the space between adjacent storage shelf modules (e.g. 310a, 310b) or storage shelf units is sufficient to allow an item retrieval system 312 to pass through. and set down or retrieve items and/or storage containers 800 to or from a storage shelf module (e.g. 310a, 310b). Preferably, the height of the storage shelf modules (e.g. 310a, 310b) extend to the full internal height of a retail site (e.g. a store) to maximise the use of vertical space.

Replenishment System

Figure 9:
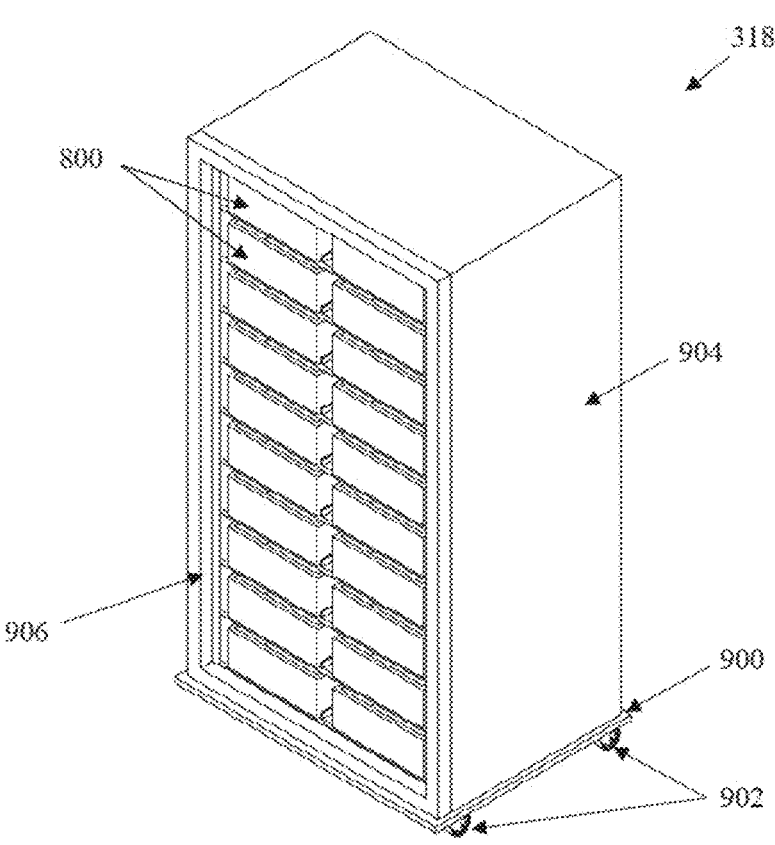
FIGS. 9 and 10 respectively show a front perspective view and a front view of a replenishment system used by the automated retail store system in FIG. 3.
Figure 10:
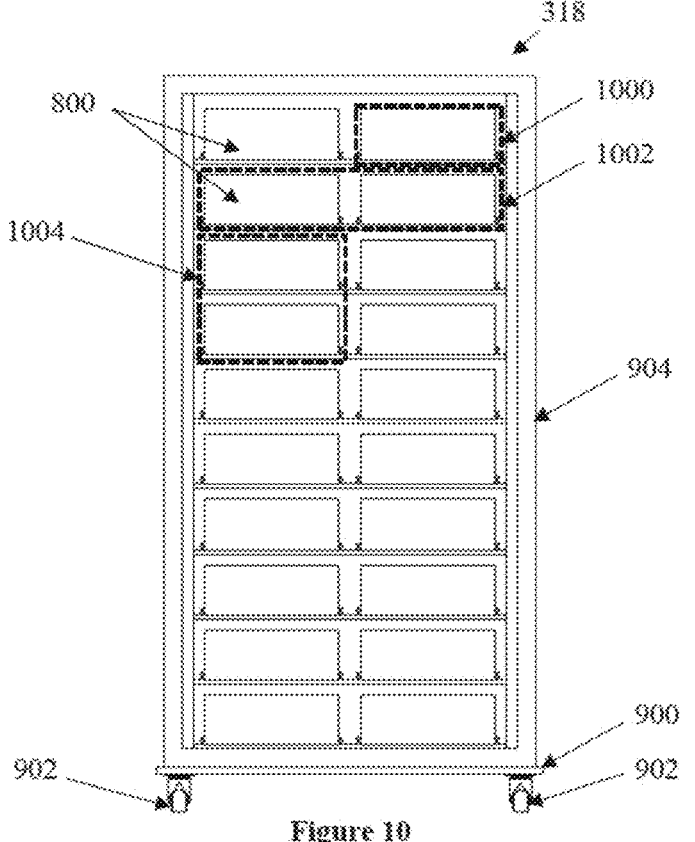
Figure 11:
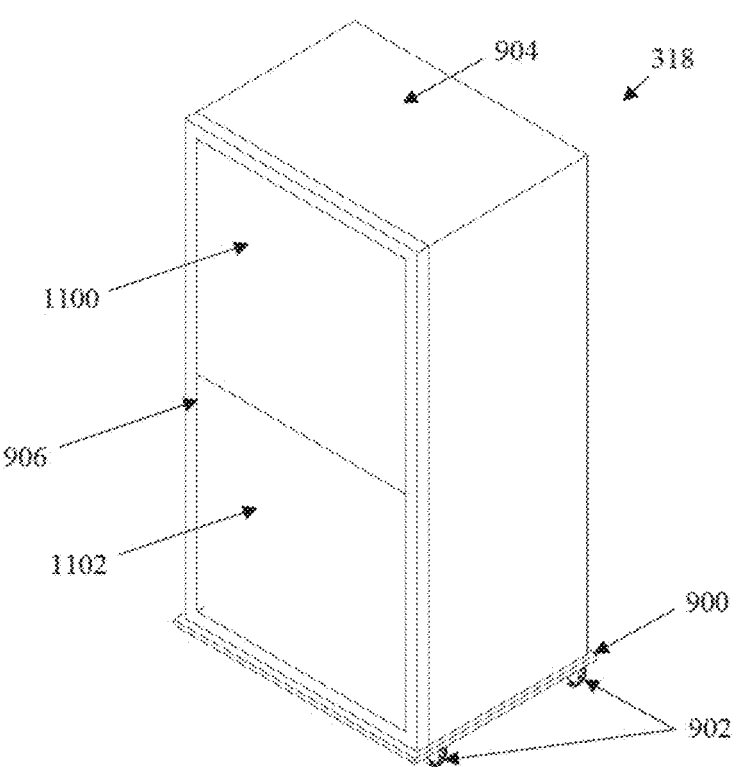
FIG. 11 is a front perspective of a replenishment system with access barriers.
Figure 12:
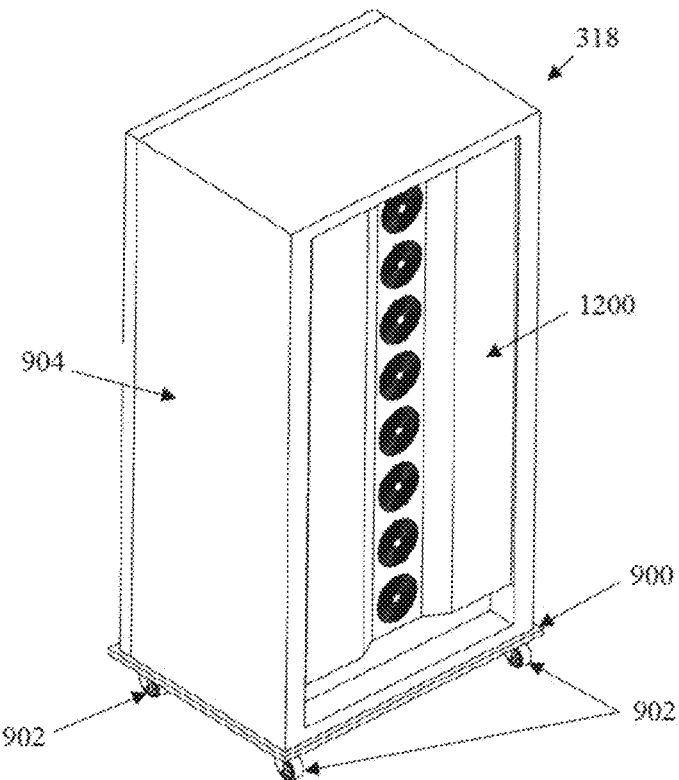
FIG. 12 is a rear perspective view of a replenishment system.

FIGS. 9 to 12 show different views of an exemplary embodiment of a replenishment system 318 that may be used with an automated retail store system 106. FIGS. 9 to 10 respectively show a front perspective view and front view of an exemplary replenishment system 318 with a front access barrier (e.g. 1100. 1102) in an open position. FIG. 11 is a front perspective view of an exemplary replenishment system 318 with a front access barrier (e.g. 1100, 1102) in a closed position. FIG. 12 is a rear perspective view of an exemplary replenishment system 318.

The replenishment system 318 comprises of a base 900 mounted on one or more wheels 902 that allows the replenishment system 318 to move (e.g. pushed or pulled along) a floor surface. The replenishment system 318 includes an enclosure body 904 extending upwards from the base 900. The enclosure body 904 defines an internal storage space that is divided into one or more different storage compartments, each storage compartment being configured for receiving and removably storing one or more storage containers 800. The replenishment system 318 may have storage containers 800 with items that are for restocking the automated retail store system 106. Storage containers 800 that are empty or contain defective, damages or perished items may be retrieved from the automated retail store system 106 (e.g. by an item retrieval system 312) and placed inside the replenishment system 318 for removal.

In the example shown in FIGS. 9 and 10, the internal storage space is divided into a plurality of storage shelf layers, each storage shelf layer being configured to receive and removably store one or more storage containers 800. In representative embodiments of the present invention, for example as shown in FIG. 10, a storage compartment may refer to: (i) a discrete space 1000 for receiving a single storage container 800; (ii) a horizontal space 1002 (e.g. in a storage shelf layer) for receiving and storing a plurality of storage containers 800; or (iii) a vertical space 1004 (e.g. across different storage shelf layers) for receiving and storing a plurality of storage containers 800.

Each storage compartment in the replenishment system 318 can be configured to serve a different function. For example, a storage compartment may be configured to provide: (i) an ambient storage environment for items; or (ii) an enclosed temperature-controlled storage environment for storing temperature-sensitive items. For example, a temperature-controlled storage environment may comprise: (i) an enclosure that provides a storage environment for one or more storage containers 800, such that when the enclosure is in a closed configuration, the storage environment is separated or isolated from the space surrounding the enclosure so as to minimise the impact of air temperature outside the enclosure from affecting the air temperature inside the enclosure; (ii) one or more temperature sensors for detecting a temperature inside the enclosure; (iii) one or more temperature control units (e.g. peltier units) for applying heat and/or cooling to air inside the enclosure; (iv) one or more air flow regulators for controlling a flow of air into the enclosure, flowing outwards from the enclosure, or flowing within the enclosure; and (v) a control unit for controlling the operation of the temperature control units and/or air flow regulators based on input signals or data received from the one or more temperature sensors. Each enclosure has an opening and an access barrier for controlling access into the enclosure through the opening. When the access barrier is in an open configuration, storage containers 800 can pass through the opening to be placed into (or retrieved from) the enclosure. When the access barrier is in a closed configuration, physical items cannot pass through the opening, and according to one embodiment, the enclosure is in a closed configuration as described above.

The enclosure body 904 of the replenishment system 318 is preferably made from a rigid material to protect the items stored inside the replenishment system 318. The enclosure body 904 includes an opening 906 and an access barrier (e.g. 1100, 1102) for controlling access into the enclosure body 904 through the opening 906. When the access barrier (e.g. 1100, 1102) is in an open configuration, storage containers 800 can pass through the opening 906 to be placed into (or retrieve from) a storage space inside the enclosure body 904. When the access barrier (e.g. 1100, 1102) is in a closed position (see FIG. 11), physical items cannot pass through the opening, and according to one embodiment, the storage environment inside the enclosure body 904 is separated or isolated from the space surrounding the enclosure body 904 so as to minimise the impact of air temperature outside the enclosure body 904 from affecting the air temperature inside the enclosure body 904.

If the entire internal storage space defined by the enclosure body 904 is to be used as a single temperature-controlled storage environment, the replenishment system 318 may include (i) one or more temperature sensors for detecting a temperature inside the enclosure body 904; (ii) one or more temperature control units (e.g. peltier units or a peltier system 1200 as shown in FIG. 12) for applying heat and/or cooling to air inside the enclosure body 904; (iv) one or more air flow regulators for controlling a flow of air into the enclosure body 904, flowing outwards from the enclosure body 904, or flowing within the enclosure body 904; and (v) a control unit for controlling the operation of the temperature control units and/or air flow regulators based on input signals or data received from the one or more temperature sensors.

Figure 13:
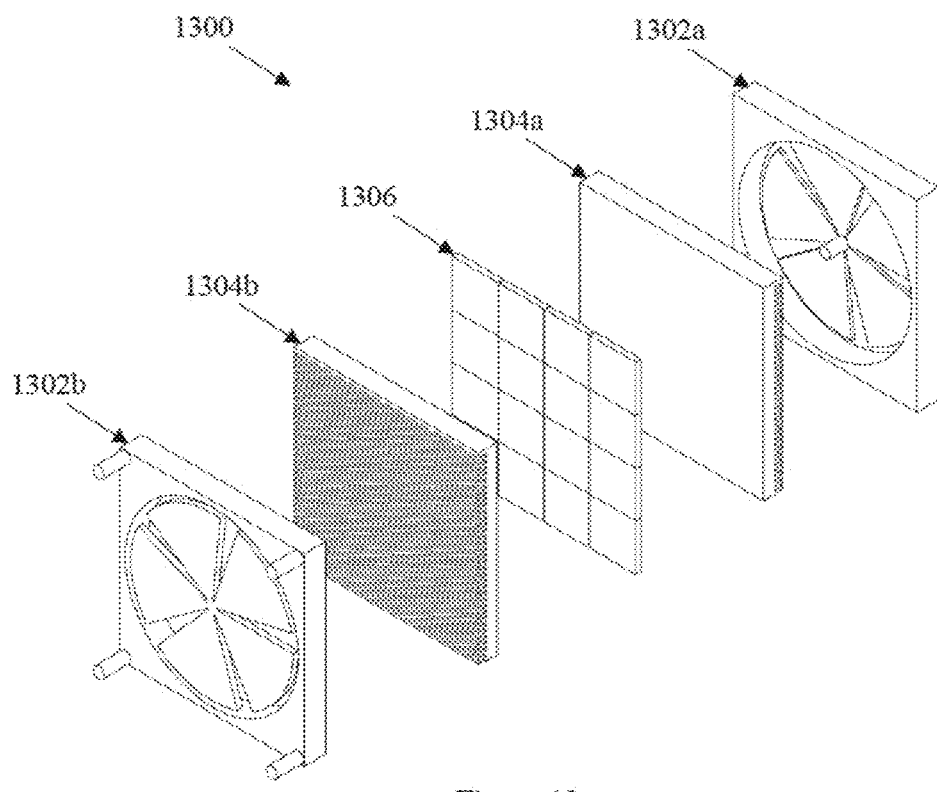
FIGS. 13 and 14 respectively show an exploded view and combined view of key components of a peltier system.
Figure 14:
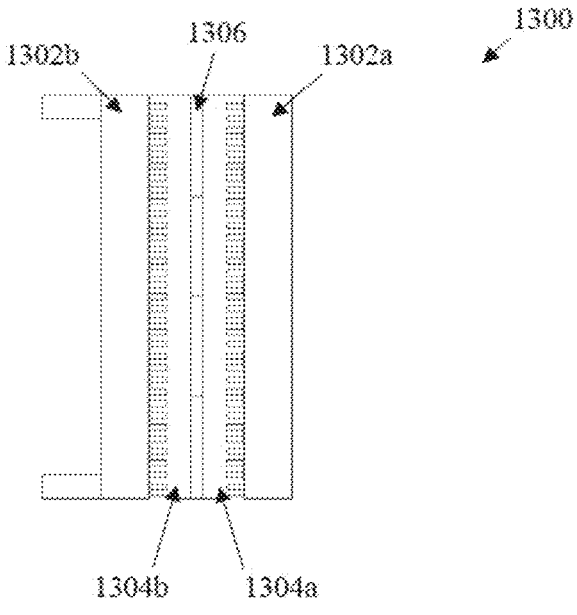

FIGS. 13 and 14 respectively show an exploded view and an assembled side view of an exemplary embodiment of a single peltier unit 1300 for use in the replenishment system 318. A plurality of such peltier units 1300 can be combined for operation together as a peltier system 1200. In the example shown in FIGS. 13, and 14, each peltier unit 1300 comprises of two air flow regulators 1302*a* and 1302*b* (e.g. a fan), two heat sinks 1304*a* and 1304*b,* and a semiconductor 1306. Depending on the direction of electrical current applied to the semiconductor 1306, heat is transferred from one side of the semiconductor 1306 to the other, and this characteristic of a peltier is used to apply heating or cooling to air surrounding or passing around the peltier unit. Once the required direction of electrical current is determined to achieve the desired heating or cooling effect, the application of electrical voltage or current to the peltier unit 1300 is controlled to control the extent of heating or cooling required.

The replenishment system 318 is particularly advantageous because its internal storage areas can be configured (e.g. according to any of one or more predetermined configurations) to provide different temperature-controlled storage areas, where the temperature for each temperature-controlled storage area can be separately and independently controlled such that different temperature-controlled storage areas can be maintained at different temperature ranges without affecting each other. This allows the replenishment system 318 to provide at least three temperature ranges for storing items, for example: (i) an ambient storage temperature range; (ii) a below ambient temperature range (e.g. suitable for storing chilled or frozen items); and (iii) an above ambient temperature range (e.g. for storing hot food).

According to one embodiment, the replenishment system 318 provides a protected and sealed environment for transporting items. According to one aspect of the invention, the replenishment system 318 (including any one or more of the features described above) is used in a method of transporting items from a point of origin (e.g. a supply warehouse) to an automated retail store system 106. This helps minimise the impact of changes in the external environment (e.g. hot temperatures, direct sunlight, physical interference, etc.) from affecting the quality or nature of the items being transported.

Customer Locker System

Figure 15:
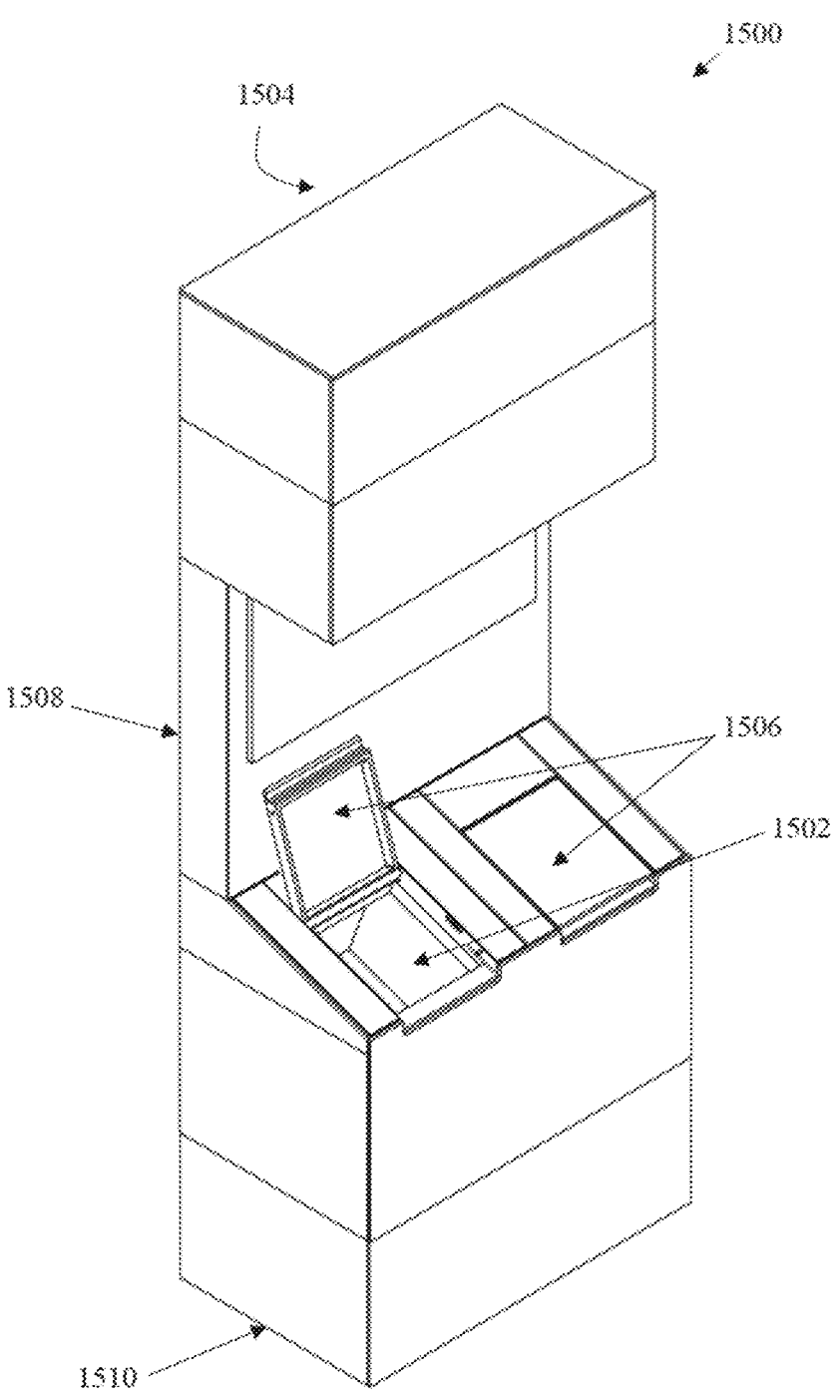
FIG. 15 is a front perspective view of a customer locker module according to one representative embodiment of the invention.
Figure 16:
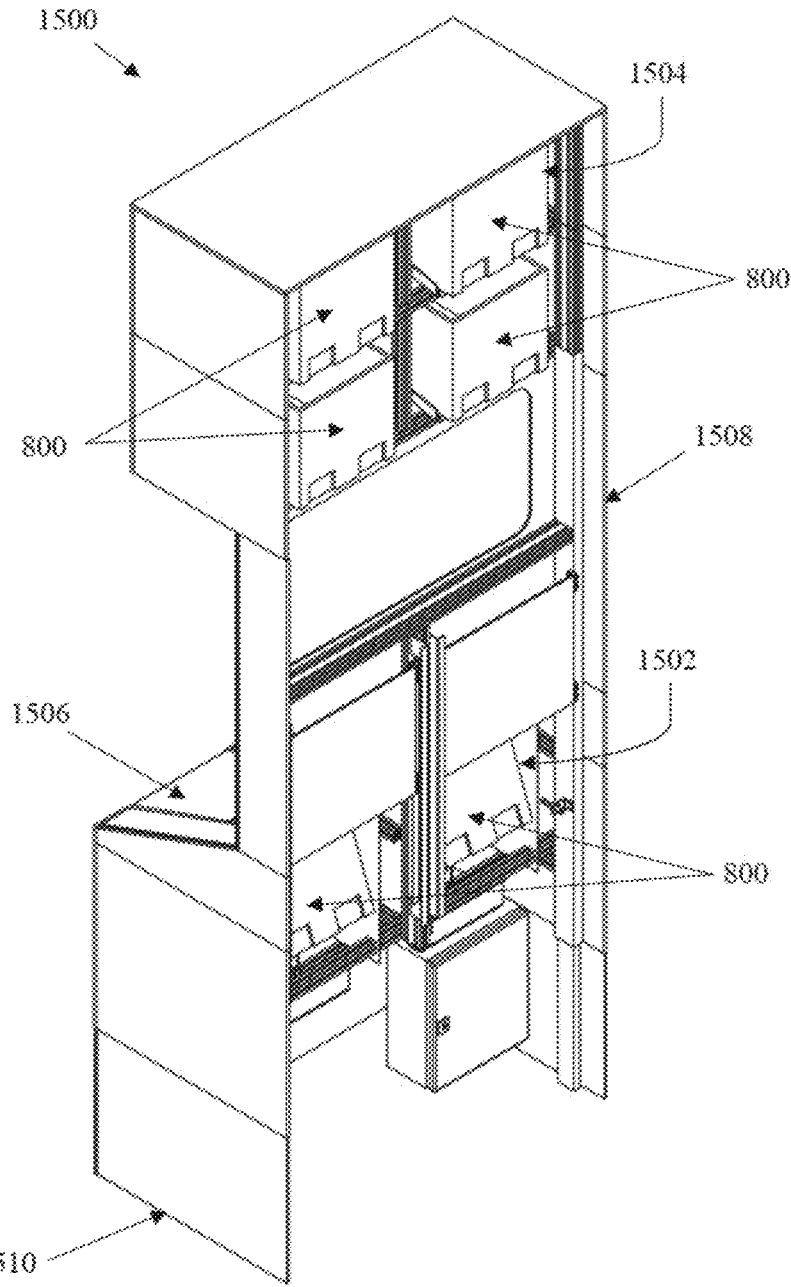
FIGS. 16 and 17 are rear perspective views of the customer locker module in FIG. 15.
Figure 17:
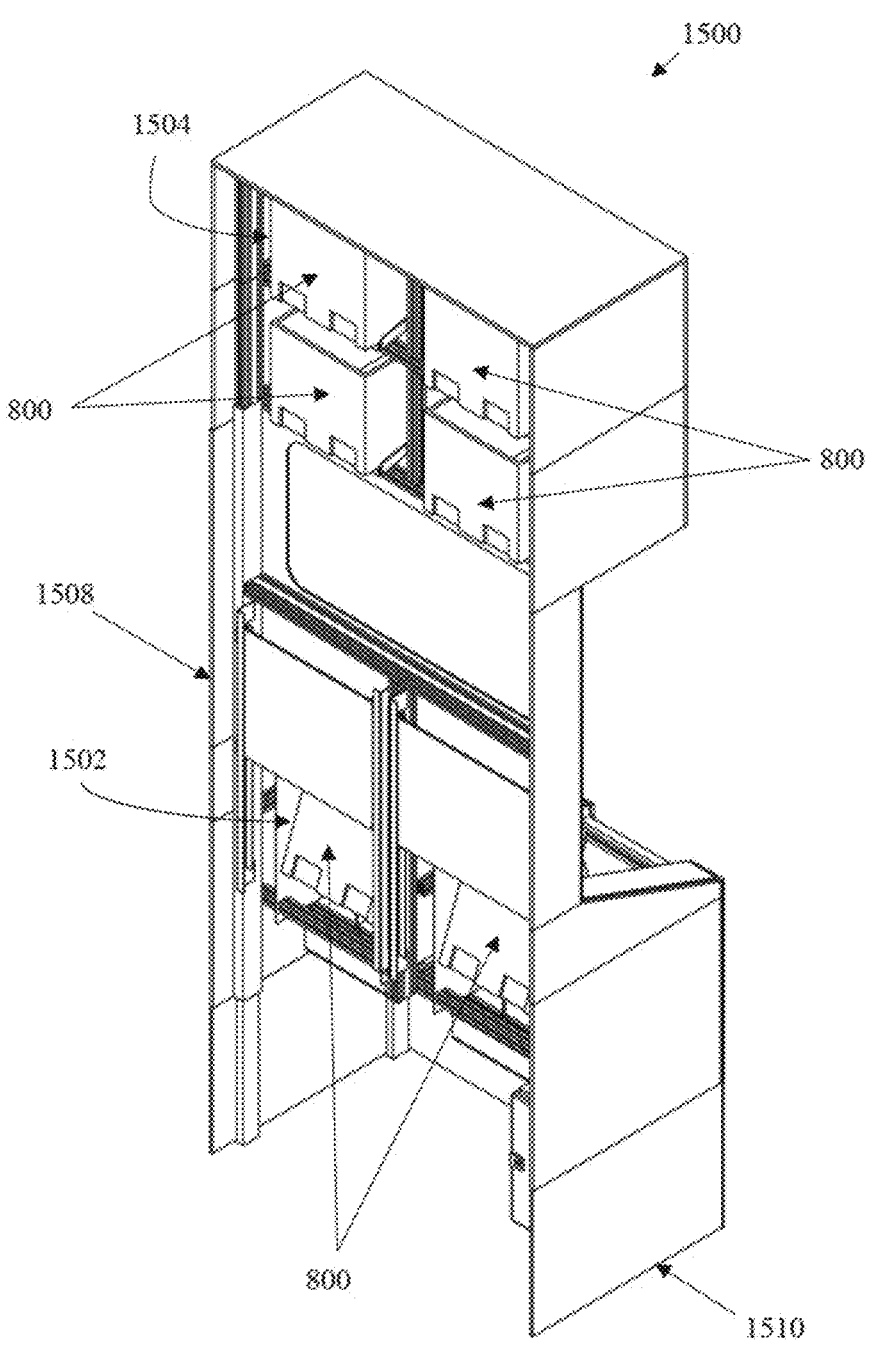
Figure 18:
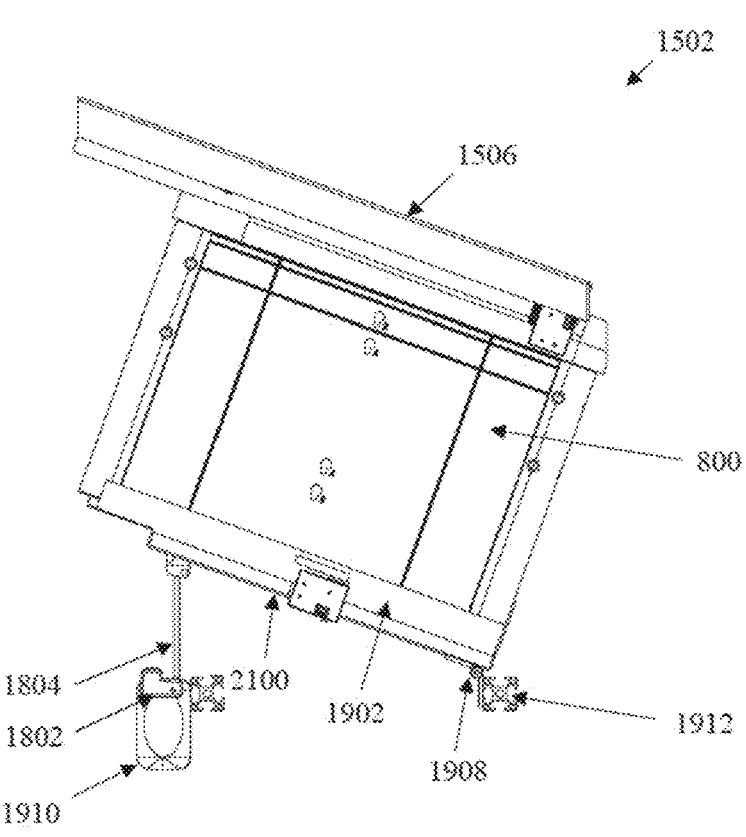
FIGS. 18 to 21 respectively show a side view, front perspective view, rear perspective view and bottom perspective view of the key components of a customer locker compartment.
Figure 19:
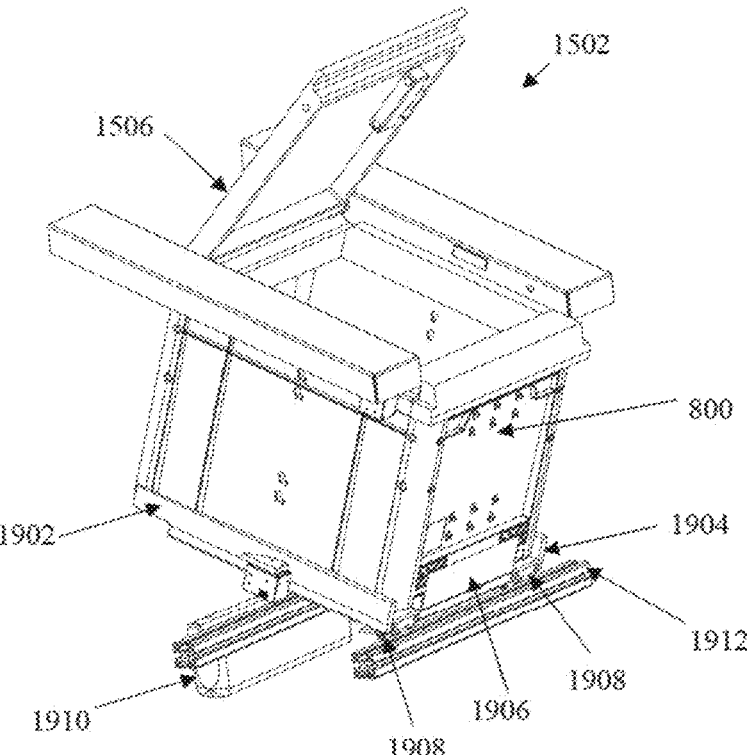
Figure 20:
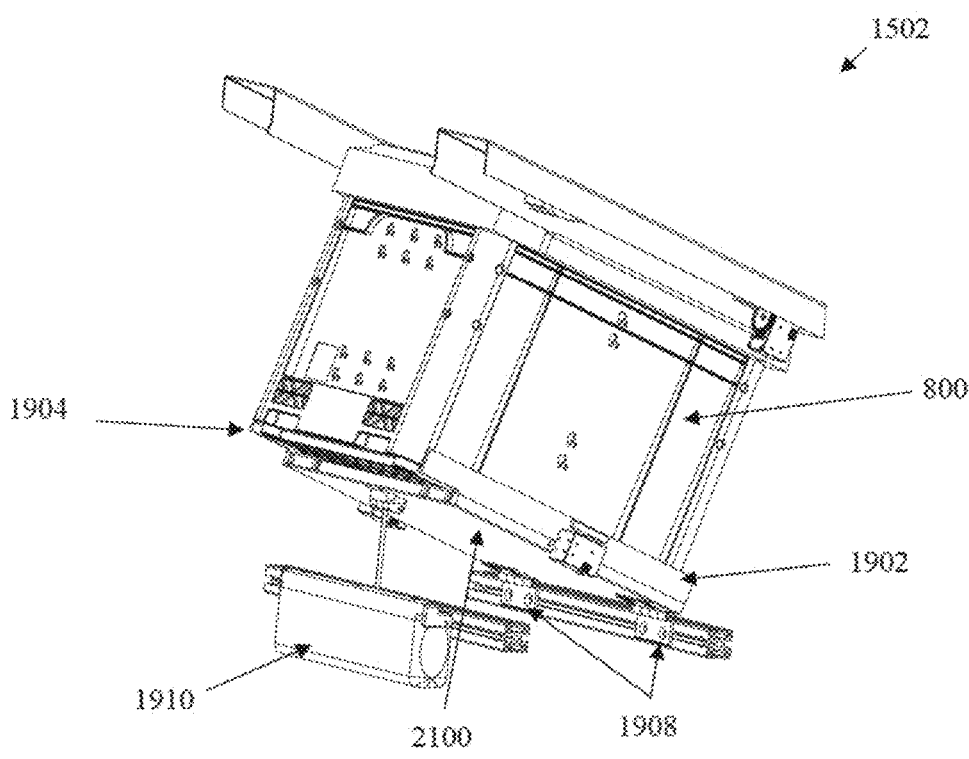
Figure 21:
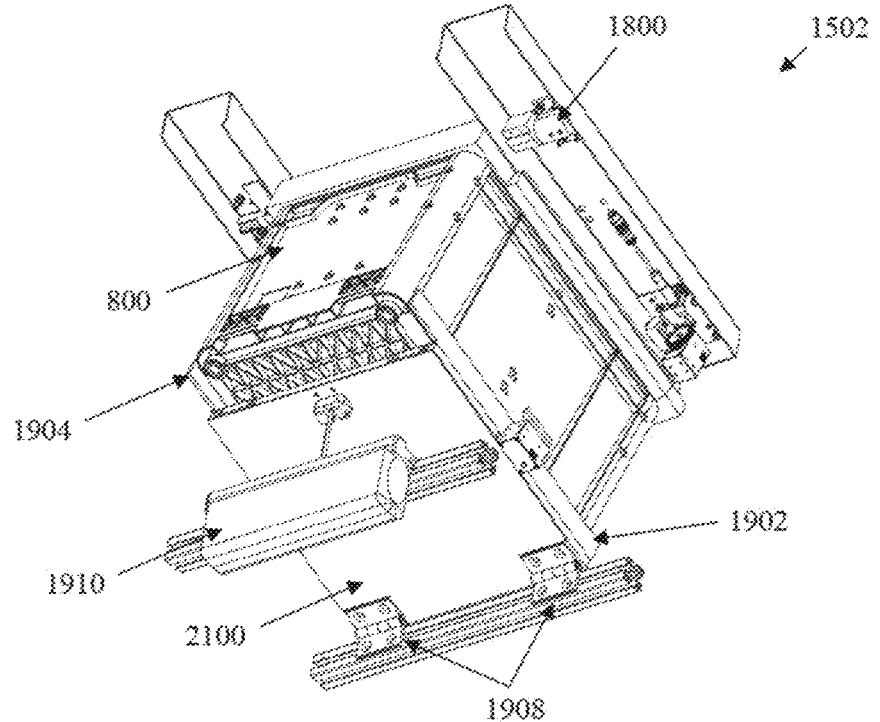

FIGS. 15 to 21 show different aspects of the customer locker module 1500 according to one representative embodiment of the invention. FIG. 15 is a front perspective view of an exemplary customer locker unit 1500. FIGS. 16 and 17 are different rear perspective views of the exemplary customer locker unit shown in FIG. 15.

The customer interface zone 306 includes one or more customer locker modules 1500. Each customer locker module 1500 can be configured according to any selected one of one or more predetermined customer locker module configurations. Each customer locker module configuration includes data that defines a unique predetermined combination, arrangement and/or configuration of: (i) one or more customer locker modules 1500 either individually or in combination as single unit; (ii) storage space for a customer locker compartment 1502 for storing one or more storage containers 800; (iii) storage space for a customer storage compartment 1504 for storing one or more storage containers 800; and/or (iv) any related physical equipment, components and/or sensors for use with a customer locker module 1500, customer locker compartment 1502 or customer storage compartment 1504. A plurality of customer locker modules 1500 can be coupled together to form a customer locker unit. The customer locker modules 1500 for each customer locker unit may be configured for use as one unit according to any one of one or more predetermined customer locker unit configurations.

Each customer locker module 1500 comprises of a body 1508 that defines an internal storage space. The internal storage space can be configured to provide: (i) one or more customer locker compartments 1502 each for receiving and removably storing one or more storage containers 800; and/or (ii) one or more customer storage compartments 1504 each for receiving and removably storing one or more storage containers 800.

According to a representative embodiment, each customer locker module 1500 is configured according to one of several different predetermined customer locker module configurations, where each customer locker module configuration represents a different internal spatial and/or functional configuration of each customer locker compartment 1502 and/or customer storage compartment 1504 of the customer locker module 1500. For example, a customer locker module configuration may define the number, size, location and operational/functional capability of each customer locker compartment 1502 and/or customer storage compartment 1504 in a customer locker module 1500. Similarly, a customer locker unit configuration may define the number, size, location and operational/functional capability of each customer locker compartment 1502 and/or customer storage compartment 1504 in a combination of customer locker modules 1500 when combined as a single unit.

For example, a customer locker module 1500 may be configured to provide a combination of customer locker compartments 1502 and customer storage compartments 1504. Alternatively, a customer locker module 1500 may be configured to provide only: (i) one or more customer locker compartments 1502 (and no customer storage compartments 1504); or (ii) one or more customer storage compartments 1504 (and no customer locker compartments 1502). FIGS. 16 and 17 show an exemplary embodiment of a customer locker module 1500 configured to provide two customer locker compartments 1502 in a side-by-side configuration, where each customer locker compartment 1502 is configured to receive and store a single storage container 800. The customer locker module 1500 is also configured to provide four customer storage compartments 1504 in a two-by-two configuration, where each customer storage compartment 1504 is configured to receive and store a single storage container 800. Preferably, the customer storage compartments 1504 are provided above the customer locker compartments 1502 (e.g. to make use of the full height of the store for storage purposes). However, in other embodiments, the customer storage compartments 1504 can be provided either below (or both above and below) the customer locker compartments 1502.

According to a representative embodiment of the invention, a customer locker compartment 1502 (or a customer storage compartment 1504) may be configured to provide a temperature-controlled storage space. This helps preserve the integrity and/or quality of the items ordered by the customer before the customer picks up the item. A customer locker compartment 1502 (or a customer storage compartment 1504) may comprise any one or more of the following types of modules:

i) A temperature control module for selectively applying heating and/or cooling to at least a part of the internal storage space of a customer locker compartment 1502 or customer storage compartment 1504.

ii) A temperature sensor module for detecting a temperature in at least a part of the internal storage space of a customer locker compartment 1502 or customer storage compartment 1504.

iii) an air circulation module for selectively controlling a flow of air into, flowing out from or flowing within the internal storage space of a customer locker compartment 1502 or customer storage compartment 1504. For example, the air circulation module may control a flow of air external to the customer locker module 1500 into the customer locker compartment 1502 or customer storage compartment 1504, and/or control a flow of air from a customer locker compartment 1502 or customer storage compartment 1504 to a space external to the customer locker module 1500.

iv) A control module for controlling an operation of a temperature control module, temperature sensor module and/or an air circulation module (as described above);

v) An insulated storage module providing an insulated storage environment for storing one or more storage containers 800. The insulated storage module may comprise of barrier members (e.g. walls) that define an enclosed storage space for receiving one or more storage containers 800, where access to the enclosed storage space is controlled by an access barrier (e.g. door), and when the access barrier is closed the enclosed storage space is completely isolated from an external environment external to the barrier members. Preferably, the barrier members are made from a temperature insulating material to resist any changes in temperature of the external environment from affecting a temperature inside the enclosed storage space.

vi) A physical barrier module for providing physical separation between adjacent customer locker compartments 1502 or customer storage compartments 1504.

Storage containers 800 containing items ordered by the customer can be placed in a customer locker compartment 1502 for the customer to retrieve after successful verification of the customer. This is done if there is a customer locker compartment 1502 available for receiving at least one of the one or more storage containers 800 containing items ordered by the customer, and the current time is within a predetermined threshold period of time before the customer's pickup time indicated in the order information. If the customer locker compartment 1502 is configured to provide a temperature-controlled storage space, the customer locker compartment 1502 can be controlled (e.g. by the store control system 500 and/or the customer locker control module 504) such that the temperature inside the customer locker compartment 1502 is maintained within a temperature range suitable for the items being stored therein (e.g. at an ambient temperature, at a below ambient temperature for storing chilled or frozen items, or at an above ambient temperature for storing warm or hot items).

If there are a plurality of storage containers 800 containing items ordered by the customer, and the current time is outside a predetermined threshold period of time before the customer's pickup time indicated in the order information, the storage containers 800 containing items ordered by the customer can be temporarily placed in a customer storage compartment 1504, and then moved to an available customer locker compartment 1502 (e.g. when the current time is within a predetermined threshold period of time before the customer's pickup time indicated in the order information). If there are insufficient available customer locker compartments 1502 for holding all of the storage containers 800 containing items ordered by the customer, then the store control module 500 attempts to place at least one of these storage containers 800 into one or more available customer locker compartments 1502, and the remaining storage containers 800 into one or more available customer storage compartment 1504.

The ability to adjust the height of the customer locker compartment 1502 is particularly important for catering to the different physical needs of different customers. This is particularly important to allow items to be conveniently retrieved, for example, by customers in wheelchairs, as well as customers of different heights.

According to one representative embodiment, the customer locker compartments 1502 of a customer locker module 1500 (or each customer locker compartment 1502 individually) is adjustable in height relative to a base portion 1510 of the customer locker module 1502, wherein the customer locker compartment(s) 1502 is/are adjustable to height corresponding to at least one of the following:

(i) A predetermined height position relative to a base portion of said customer locker module. For example, this adjustment to a desired predetermined height which may be determined based on a height of (or a height selected by) a customer as being a preferred height that allows the user to conveniently access the items from a storage container 800 inside a customer locker compartment 1502. The predetermined height may be stored in the customer's profile or order information, and used by the customer locker module 1500 to configure the height of the relevant customer locker compartment 1502 before the customer arrives to pickup the ordered items at the pickup time set in the order information.

(ii) A selected one of several different predetermined height positions that are determined relative to a base portion 1510 of said customer locker module 1500. For example, this option provides the ability to make stepped adjustment to the height of a customer locker compartment 1502 depending on the needs of a customer. For example, the customer locker compartment 1502 may be initially adjusted to a predetermined height position, after which the customer can make further stepped adjustments to the height of a customer locker compartment 1502 (e.g. based on control signals or information obtained from respective buttons or sensors operated by the customer for moving a customer locker compartment 1502 in an upward or downward direction). Alternatively, the customer locker module 1500 can automatically make further stepped adjustments to the height of a customer locker compartment 1502 (e.g. based on control signals or information obtained from one or more height or proximity detection sensors of the customer locker module 1500 based on which the relevant customer locker compartment 1502 is controlled to move in an upward or downward direction).

(iii) a height between a minimum height position and a maximum height position, wherein the minimum and maximum height positions are respectively determined relative to a base portion 1510 of the customer locker module 1500. This is similar to option (ii) above except that height adjustments can be made in a smooth and gradual manner.

For example, the customer locker compartments 1502 of a customer locker module 1500 (or each customer locker compartment 1502 individually) includes actuating means for moving the customer locker compartment(s) 1502 in an upward or downward direction. In an exemplary embodiment, the actuating means may comprise of a hydraulic actuator with one end coupled to a portion of the customer locker module 1500 and the other end coupled to a support structure defining the customer locker compartment 1502. The hydraulic actuator can be configured into an extended position for positioning the customer locker compartment 1502 at a maximum height position, and configured into a retracted position for positioning the customer locker compartment 1502 at a minimum height position. In another exemplary embodiment, the actuating means may comprise of an electric motor coupled to a portion of the customer locker module 1500 (or coupled to a support structure defining the customer locker compartment 1502), where the electric motor is configured to drive a pinion (or circular gear) that engages a rack (or linear gear) coupled to a support structure defining the customer locker compartment 1502 (or a portion of the customer locker module 1500). The pinion is configured to move to one end of the rack for positioning the customer locker compartment 1502 at a maximum height position, and is configured to move to the other end of the rack for positioning the customer locker compartment 1502 at a minimum height position.

Adjusting a height position of the customer locker compartment 1502 involves selectively controlling an operation of the actuating means to move a customer locker compartment 1502 between a minimum height position and a maximum height position. Preferably, the actuating means is controlled based on at least one of: (i) sensor data generated by one or more sensors, the sensor data representing a detected height or position of a customer relative to a base portion 1510 of the customer locker module 1500; and (ii) control data generated by control means, the control data representing signals or instructions for controlling the actuating means to move a customer locker compartment towards either a minimum height position or a maximum height position.

Each customer locker compartment 1502 includes an access barrier 1506 located proximate to an opening of a customer locker compartment 1502 for controlling external access to the contents of that customer locker compartment 1502 (e.g. items stored in a storage container 800 received in the customer locker compartment 1502). Preferably, the access barrier 1506 is a rigid panel (see FIGS. 15 and 16). The access barrier 1506 is configured to move towards an open position to allow external access to the contents of the storage container 800 stored in said customer locker compartment 1502. The access barrier 1506 is configured to move towards a closed position to resist external access to the contents of the storage container 800 stored in the customer locker compartment 1502.

The movement of the access barrier 1506 for a customer locker compartment 1502 may be controlled based on data and/or signals generated by one or more safety sensors. According to one embodiment, a first safety sensor is used to detect the presence of a storage container 800 received in a customer locker compartment 1502, which serves as a precondition for allowing the access barrier 1506 for that customer locker compartment 1502 to move towards an open position to allow external access to the contents of that storage container 800. According to another embodiment, a second safety sensor is used to detect whether the access barrier 1506 for a customer locker compartment 1502 has been properly closed, which serves as a precondition for allowing the storage container 800 to be removed from that customer locker compartment 1502. According to another embodiment, a safety sensor may be located proximate to the opening of that customer locker compartment 1502 so as to be able to detect the presence of an object (e.g. a customer's hand, limb or a foreign object) located proximate to the opening of the customer locker compartment 1502. When the safety sensor detects the presence of an object proximate to the opening of the customer locker compartment 1502, the safety sensor generates control signals or data that is used to control a rate of movement (e.g. substantially slow down) or an extent of movement (e.g. stop the movement) of the relevant access barrier 1506 to avoid causing potential harm to a customer or damage surrounding objects.

Preferably, when the access barrier 1506 is configured to an open position, the access barrier 1506 is biased (e.g. by gravity, or by a spring or similar mechanism) to move towards the close position. For example, the access barrier 1506 may be coupled to a soft-close mechanism 1800 configured to control a gradual rate of movement of the access barrier 1506 from an open position towards the closed position.

According to a representative embodiment, a modular customer locker unit includes at least one of customer locker module 1500 having a verification module configured to verify an identity of a customer (or a unique identifier associated with an order), and only allow the customer to access the items ordered by the customer from a customer locker compartment 1502 when the identity of the customer (or a unique identifier associated with an order) has been successfully verified. Once the identity of the customer (or a unique identifier associated with an order) has been successfully verified, the store control system 500 obtains profile data relating to the identified customer, and based on this profile data, controls or adjusts the height of a customer locker compartment 1502 containing items order by the customer. After the customer locker compartment 1502 has been adjusted to the required height based on the profile data relating to the identified customer, the store control system 500 then controls the operational state of an access barrier for the customer locker compartment 1502. For example, the store control system 500 automatically controls the access barrier 1506 to place it into an open configuration to allow the customer access to the contents of the customer locker compartment 1502. After a predetermined period of time, and when the safety sensor does not detect any objects that could potentially interfere with the operation of the access barrier 1506, the store control system 500 automatically controls the access barrier 1506 to place it into a closed configuration to prevent external access to the customer locker compartment 1502.

FIGS. 18 to 21 show the key structural elements for each customer locker compartment 1502. Each customer locker compartment 1502 comprises at least of a base panel 2100, and rail members 1902 and 1904 arranged in parallel along opposing sides of the base panel 2100. The rail members 1902 and 1904 serve as a guide for a storage container 800 sliding into a customer locker compartment 1502. Preferably, a protruding member 1906 is provided at one end of base panel 2100 which sets an extent to which a storage container 800 can slide into (or be received in) a customer locker compartment 1502.

In the exemplary embodiment shown in FIGS. 18 to 21, each customer locker compartment 1502 may be adapted such that its access barrier 1506 and any storage container 800 received in that customer locker compartment 1502 are tilted towards said customer at a tilt angle relative to a horizontal level. As shown in FIGS. 18 to 21, one end of the base panel 2100 includes one or more hinge members 1908 that are coupled to a structural member 1912 of the customer locker module 1500. The base panel 2100 therefore moves in a hinged manner relative to the structure member 1912. Tilt actuating means 1910 is provided to raise or lower an opposing end of the base panel 2100 that is distal from the hinge members 1908. For example, the tilt actuating means may comprise of an electric servo motor coupled to a gear mechanism 1802 that in turn is coupled to a connector 1804. The connector 1804 refers to any mechanism (e.g. a push rod or a double link articulated anchor connector chain) that is capable of translating movement of the electric servo motor and/or gear mechanism 1802 into movement along a defined path. The electric servo motor rotates the gear mechanism 1802 in one direction to extend the connector 1804, which raises the opposing end of the base panel 2100 relative to the hinge 1908 and structural member 1912 and tilts the storage container 800 received in the customer locker compartment 1502 towards the customer (i.e. increases the tilt angle of the storage container 800). The electric servo motor rotates the gear mechanism 1802 in the opposite direction to retract the connector 1804. which lowers the opposing end of the base panel 2100 relative to the hinge 1908 and structural member 1912 and tils the storage container 800 received in the customer locker compartment 1502 away from the customer (i.e. decreases the tilt angle of the storage container 800).

For example, the tilt angle may be determined as either: (i) a predetermined tilt angle relative to the horizontal level; (ii) a selected one of several predetermined tilt angles relative to the horizontal level; or (iii) a tilt angle that is adjustable between a predetermined maximum tilt angle and a minimum tilt angle, wherein adjustment of the tilt angle is performed under the control of adjustment data or signals obtained based on input from a customer. The adjustment data or signal may be obtained from respective switches or sensors (operated by the customer) for controlling the tilt angle of the storage container 800 received in the customer locker compartment 1502.

Item Retrieval System

Figure 22:
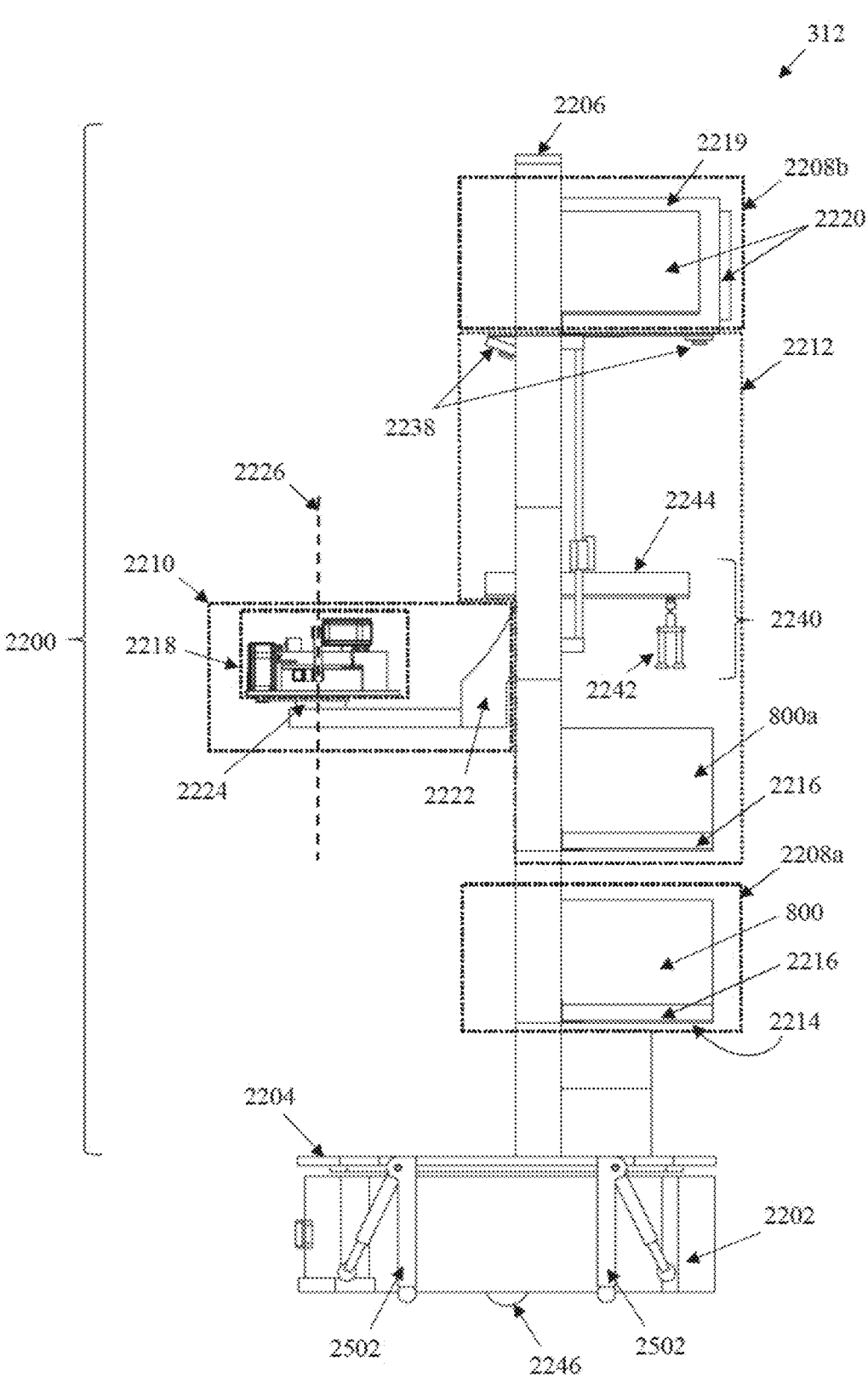
FIGS. 22, 23 and 24 respectively show a side view, front perspective view and rear perspective view of an item retrieval system according to one representative embodiment of the invention.
Figure 23:
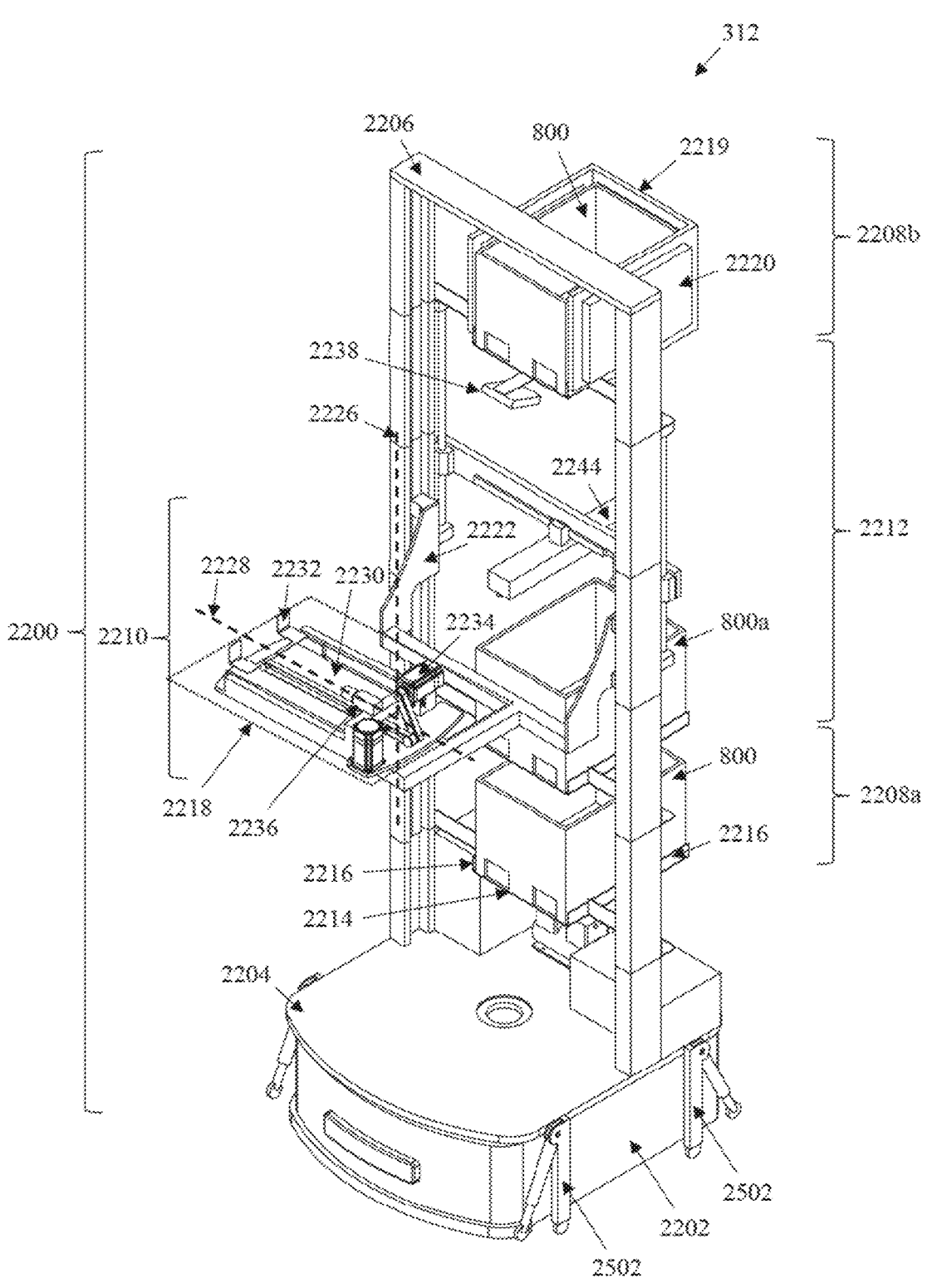
Figure 24:
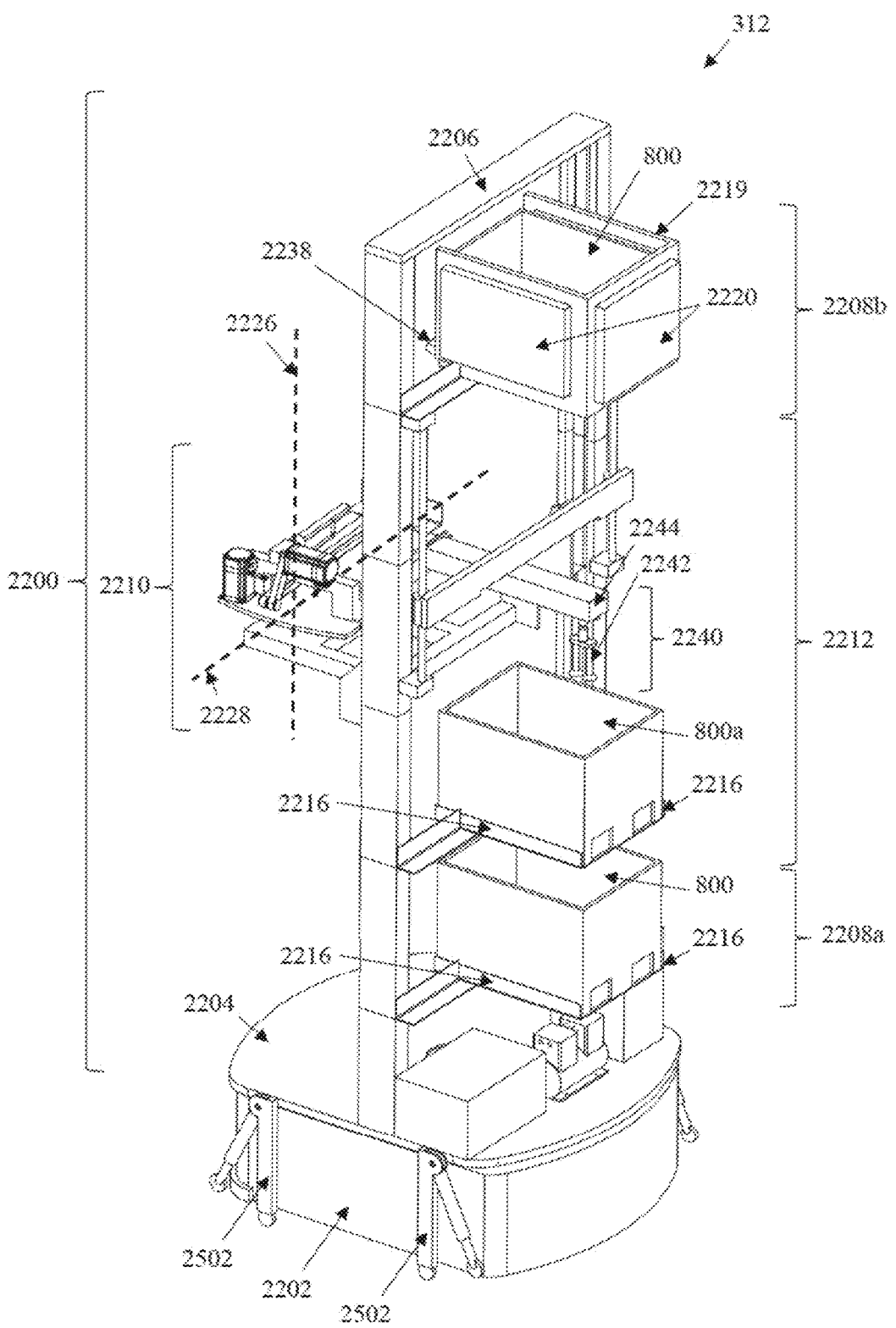

FIGS. 22, 23 and 24 respectively show a side view, front perspective view and rear perspective view of an item retrieval system 312 according to one representative embodiment of the present invention. In the representative embodiment shown in FIGS. 22 to 24, the item retrieval system 312 comprises of an upper structure 2200 and a drive unit 2202. The upper structure 2200 and drive unit 2202 can refer to different parts of a single integrated unit. Alternatively, the upper structure 2200 and drive unit 2202 can be provided as separate modules that can releasably couple with each other. Hence, in other embodiments, the item retrieval system 312 may comprise of only an upper structure 2200 without a drive unit 2202. When the drive unit 2202 is coupled to the upper structure 2200, the drive unit 2202 engages with the upper structure 2200 such that the upper structure 2200 can move together with the drive unit 2202 relative to a floor surface on which the drive unit 2202 is placed. When the drive unit 2202 is decoupled from the upper structure 2200, the drive unit 2202 can separate from the upper structure 2200 such that the drive unit 2202 can move relative to the floor surface separately and independently of the upper structure 2200. For example, the upper structure 2202 when separated from the drive unit 2202, may remain at a stationary position relative to the floor surface.

The upper structure 2200 comprises of a base 2204 and a support structure 2206 extending from the base 2204. For example, in one representative embodiment (see FIGS. 22 to 24), the support structure 2206 is a rigid support frame structure that is located on top of the base 2204. The upper structure 2200 is configured to with one or more predetermined modules coupled to the support structure 2206 according to one of several predetermined system configurations. Each system configuration includes data that defines a unique predetermined combination, arrangement and/or configuration of one or more predetermined modules and the respective locations where such modules are coupled to the support structure 2206. Each module consists of a unique combination, arrangement and/or configuration of one or more mechanical and/or control systems or components that are configured according to data for a selected one of several predetermined module configurations to perform particular functions or operations. For example, a module may be configured according to a predetermined module configuration to provide one or more of the following types of modules:

i) a storage bay module (e.g. 2208*a*, 2208*b*) configured according to a selected one of several predetermined storage bay module configurations for storing one or more removable storage containers 800;

ii) a container handling module 2210 configured according to a selected one of several predetermined container handling module configurations, where each container handling module 2210 is configured to operate under the control of a control unit of the item retrieval system 312 and/or the store control system 500 to perform one or more predefined container handling operations (e.g. including retrieving a storage container 800 from a selected retrieval location in three-dimensional space proximate to the item retrieval system 312, and moving the retrieved storage container 800 to a selected target position in three-dimensional space proximate to the item retrieval system 312); and iii) an item handling module 2212 configured according to a selected one of several predetermined item handling module configurations, where each item handling module 2212 is configured to operate under the control of a control unit of the item retrieval system 312 and/or the store control system 500 to perform one or more predefined item handling operations (e.g. including identifying one or more items in a retrieved storage container 800, retrieving a selected item from the retrieved storage container 800, and placing the selected item into another storage container 800 proximate to, or received in, the item retrieval system 312).

Figure 25:
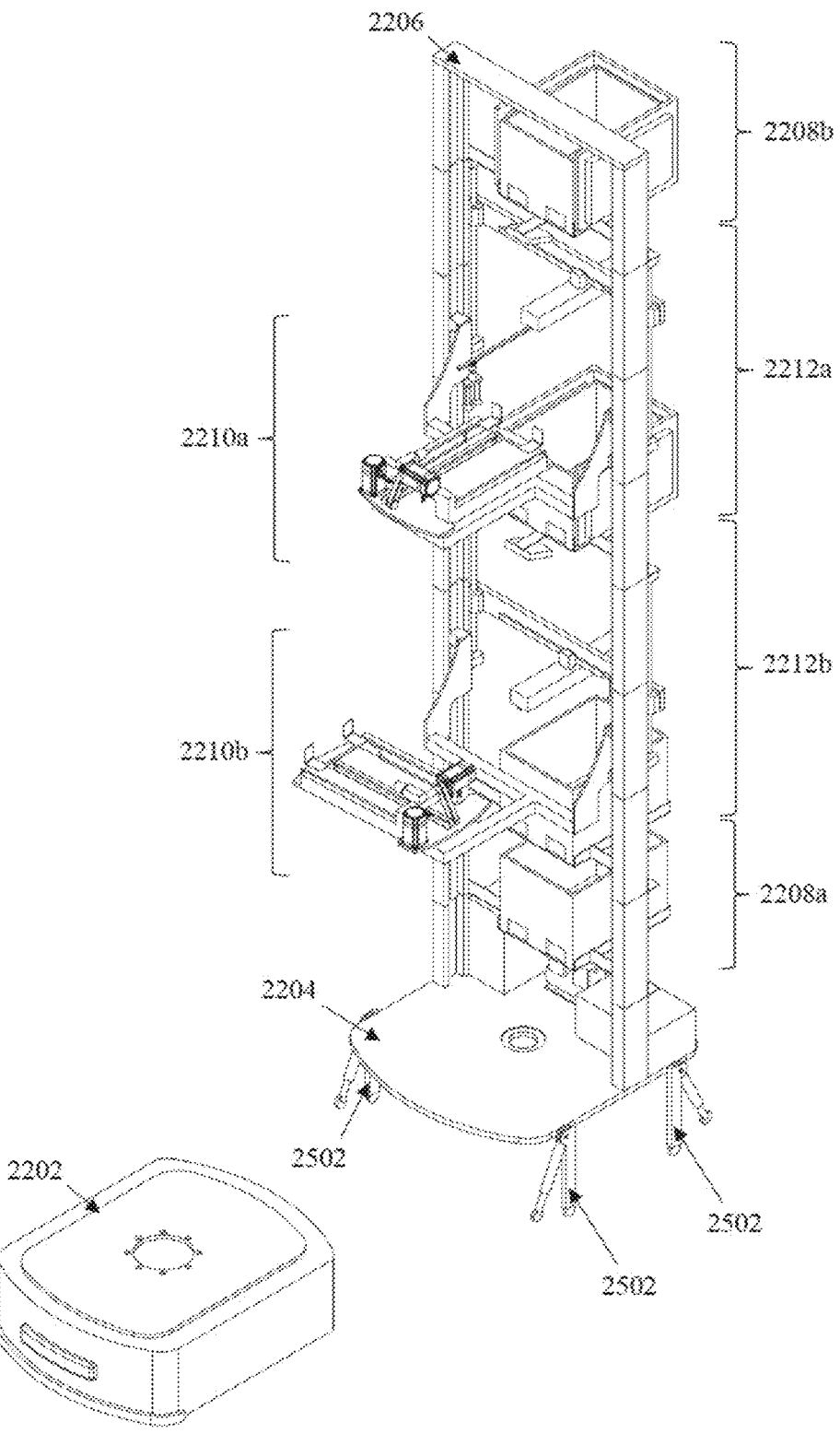
FIG. 25 shows a variation of the item retrieval system in a different configuration.

FIGS. 22 to 24 show an exemplary embodiment of an item retrieval system 312 comprising of two storage bay modules 2208a and 2208b, one container handling module 2210, and one item handling module 2212. FIG. 25 shows another exemplary embodiment of an item retrieval system 312 comprising of two storage bay modules 2208a and 2208b, two container handling modules 2210a and 2210b, and two item handling modules 2212a and 2212b.

In the examples described in this specification, a storage bay module configuration refers to a subset of the data for predetermined module configurations and includes data for configuring a module to provide removable storage of one or more storage containers 800. A container handling module configuration refers to a subset of the data for predetermined module configurations that includes data for configuring a module to performing storage container handling operations. An item handling module configuration refers to a subset of the data for predetermined module configurations that includes data for configuring a module to performing item handling operations.

The store control system 500 may communicate with (and control the operations of) different control units of different item retrieval systems 312 using separate respective communications channels. For example, each control unit may include a communications module that allows the control unit to communicate with the store control system 500 using a dedicated electrical or wireless radio communications channel. Alternatively, the store control system 500 may communicate with (and control the operations of) different control units of different item retrieval system 312 via a shared communications channel. For example, each control unit may include a communications module that allows the control unit to communicate with the store control system 500 using a wireless LAN, where the store control system 500 sends instructions, data or signal (e.g. using data packets) addressed to a particular communication module of a control unit of an item retrieval system 312.

Preferably, each item retrieval system 312 includes a control unit that controls the functions or operations performed by each of the modules coupled to the item retrieval system 312. According to one embodiment, the store control system 500 sends high level control instructions, data or signals to the control unit of a particular item retrieval system 312 (e.g. to instruct the item retrieval system 312 to retrieve a specified quantity of items from a specified storage container location in a storage shelf module). The control unit of the item retrieval system 312 executes the instructions, data or signals received from the store control system 500 by translating them into lower-level control instructions, data or signals that control the specific functions or operations performed by one or more modules coupled to the item retrieval system 312.

Each drive unit 2202 of an item retrieval system 312 also include a control unit that controls the operations of the drive unit 2202, such as the movement of the drive unit 2202 relative to a floor surface on which the drive unit 2202 is placed, and the operation state of an engagement mechanism for the drive unit 2202 to couple with or decouple from an upper structure 2200. The control unit of the drive unit 2202 may operate under the control of the store control system 500 similar to the control unit of the item retrieval system 312 as described above. In this way, the drive unit 2202 (operating under the control of its control unit) and the modules of the item retrieval system 312 (operating under the control of its control unit) may each be configured to operate separately and independently of each other under the control of the store control system 500.

In an alternative embodiment, when the drive unit 2202 decouples or separates from the upper structure 2200, the control unit of the drive unit 2202 operates under the control of instructions, data or signals generated by the store control system 500. When the drive unit 2202 is coupled to the upper structure 2200, the control unit of the drive unit 2202 operates either: (i) under the control of instructions, data or signal generated by the store control system 500, or (ii) under the control of instructions, data or signals generated by the control unit of the item retrieval system 312, which in turn operates under the control of instructions, data or signals generated by the store control system 500.

Figure 8:
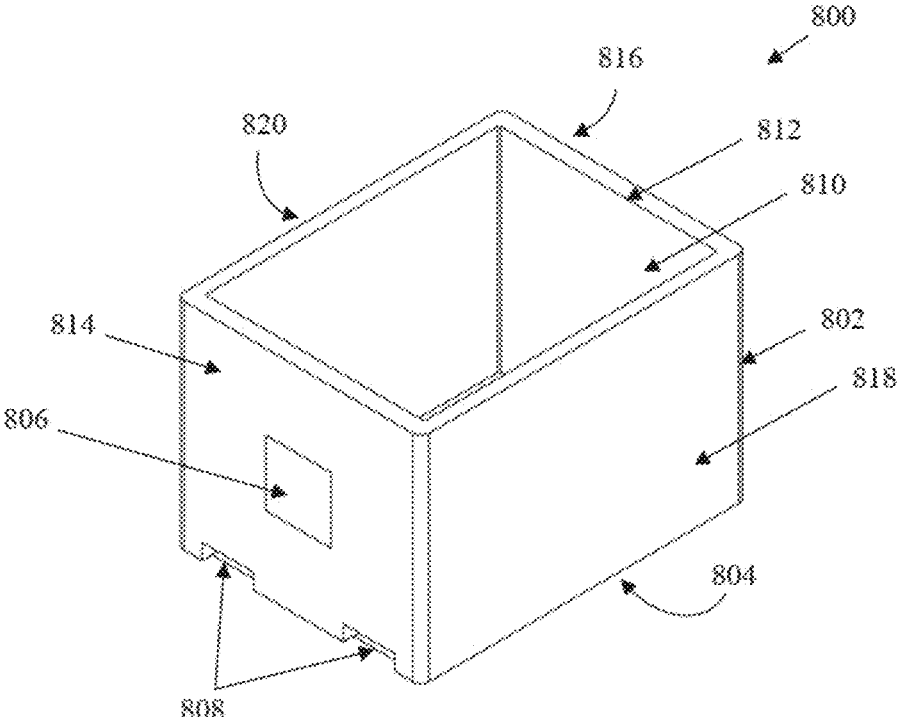
FIG. 8 is storage container used by the automated retail store system in FIG. 3.

FIG. 8 shows an example of a storage container 800 that is used in the context of the present invention. A storage container 800 is rigid container for storing one or more items. The storage container 800 comprises of a body 802, a base 804, identification means 806 and engagement means 808. The body 802 and base 804 are preferably made from a rigid material that resists deformation when items are stored inside the storage container 800, and can also protect any items stored inside the storage container 800 (e.g. from direct physical intervention). The body 802 extends from the base 804 to define a storage space 810 within which items are stored. The storage space 810 is accessible from an opening 812 provided in a top portion of the storage container 800. The identification means 806 includes any means of conveying unique identification information that is uniquely associated with a storage container 800 to enable that storage container 800 to be identified. For example, identification means 806 may be provided in the form of a QR code, bar code or RFID tag that conveys identification information (e.g. a unique identifier) that is uniquely associated with each storage container 800. The engagement means 808 refers to an external portion of the storage container 800 that allows the container handling module 2210 of an item retrieval system 312 (e.g. the container engagement means 2232) to selectively engage or disengage with each other. For example, the engagement means 808 may be shaped to provide a recess (or projection) that can selectively engage with or disengage from a corresponding projection (or recess) of the container handling module 2210 (e.g. the container engagement means 2232). As another example, the engagement means 808 may be a metallic component that can selectively engage with or disengage from a corresponding magnetic component (e.g. an electromagnet) of the container handling module 2210 (e.g. the container engagement means 2232). The engagement means 808 can be provided on any one or more external sides of the storage container 800. This allows the container handling module 2210 to conveniently engage with a storage container 800 regardless of their respective orientation relative to each other. According to one representative embodiment, the engagement means 808 is provided on one exterior side 814 and also on an opposing exterior side 816 of the storage container 800. Preferably, identification means 806 is provided on the same side of the storage container 800 where there is engagement means 808. This is so that the container handling module 2210 can identify the storage container 800 (regardless of their respective orientation relative to each other) before engaging with the storage container 800.

Each storage bay module configuration includes data that defines a unique predetermined combination, arrangement and/or configuration of: (i) storage space for a storage bay module (2208a, 2208b) to store one or more storage containers 800; and/or (ii) any related physical equipment, components and/or sensors for use with a storage bay module (2208a, 2208b). Each predetermined storage bay module configuration may uniquely configure the storage space for a storage bay module (2208a, 2208b) to provide one or more storage bay areas arranged according to a different predetermined spatial configuration, where each storage bay area defines a space that is adapted for storing one or more removable storage containers 800.

In the example shown in FIGS. 22 to 24, each storage bay module (2208a, 2208b) comprises of a supporting base 2214 for receiving one or more storage containers 800. The supporting base 2214 may be provided using one or more guide members 2216 that are shaped to support at least a portion of the base 804 of each storage container 800 received in the storage bay module (2208a, 2208b). Preferably, the guide members 2216 are also shaped to provide a longitudinal projection that interacts with at least one exterior side (e.g. 818 or 820), or with two opposing exterior sides (e.g. 818 and 820), of the storage container 800 to guide the storage container's 800 movement along a path within the storage bay module (2208a. 2208b). It should be understood that a storage bay module (2208a, 2208b) is not limited to the configuration shown in FIGS. 22 to 24. A storage bay module (2208a, 2208b) may provide a longitudinal storage bay area wherein the guide members 2216 are extended to be able to receive one or more storage containers 800. A storage bay module (2208a, 2208b) may provide a storage bay area comprising of a plurality of the longitudinal storage bay areas described above arranged side-by-side (e.g. horizontally) and/or on top of (e.g. vertically) each other.

Each storage bay module may be configured, according to a predetermined storage bay module configuration, for use with one or more of the following:

i) One or more peltier units 1300 that operate under the control of the control unit of the item retrieval system 312 for selectively applying heating or cooling to air inside a storage bay area of the storage bay module (2208a, 2208b).

ii) One or more air circulation units that operate under the control of the control unit of the item retrieval system 312 for selectively controlling a flow of air from a storage bay area of the storage bay module (2208a, 2208b) to an external environment, or from said external environment to a storage bay area of the storage bay module (2208a. 2208b).

iii) One or more first wall members 2219 for forming a storage space within each storage bay area of the storage bay module (2208a, 2208b) that is at least partially physically separated from its external environment. A first wall member 2219 may include portions 2220 of different thickness and/or rigidity to help provide additional physical protection, cushioning or resistance against vibration during movement of the item retrieval system 312.

iv) One or more second wall members (not shown in the drawings) for forming an enclosed storage space within each said storage bay area of the storage bay module (2208a, 2208b) wherein, when the storage space is placed in a closed (or sealed) configuration, the wall members resist an exchange of heat and/or an exchange of air from inside the enclosed (or sealed) storage area to an external environment.

v) One or more access barrier members for selectively providing or restricting access to a storage space inside the storage bay area of the storage bay module (2208a, 2208b) under the control of the control unit of the item retrieval system 312.

vi) One or more container sensors for detecting a presence or absence of a storage container 800 inside a storage bay area of the storage bay module (2208a, 2208b), the container sensors generating sensor data or signals to report such information to the control unit of the item retrieval system 312. For example, based on such sensor data or signals, the control unit of the item retrieval system 312 may determine whether or not an additional storage container 800 can be received in a particular storage bay module (2208a, 2208b).

vii) One or more temperature sensors for detecting a temperature of air inside a storage bay area of the storage bay module (2208a, 2208b), the temperature sensors generating temperature data or signals to report such information to the control unit of the item retrieval system 312. For example, based on such temperature data or signals, the control unit of the item retrieval system 312 may control one or more peltier units 1300 to selectively applying heating or cooling to air inside a storage bay area of the storage bay module (2208a, 2208b). This may be done to maintain the air temperature inside a storage bay area of the storage bay module (2208a, 2208b) within a predetermined temperature range suitable for storing the items stored within that storage bay area.

Each container handling module configuration includes data that defines a unique predetermined combination, arrangement and/or configuration of: (i) physical equipment. components and/or sensors for use with a container handling module 2210 (e.g. for retrieving or placing a specified storage container 800 from/to a specified location in three-dimensional space); and/or (ii) any operational requirements or constraints relating to such equipment, components and/or sensors of a container handling module 2210. In the example shown in FIGS. 22 to 24, the item retrieval system 312 has one container handling module 2210. However, in another representative embodiment (see FIG. 25), the item retrieval system 312 may have more than one container handling modules 2210. Each predetermined container handling modulation configuration may specify a unique combination. configuration and/or arrangement (e.g. in terms of position, movement, etc.) of one or more mechanisms and/or sensors of use with each container handling module 2210 relative to the support structure 2206, and/or the respective design, construction and/or operations performed by or using any such mechanism and/or sensor of the container handling module 2210.

A container handling module 2210 includes two main components: (i) container retrieval means 2218 for releasably engaging a storage container 800 to be retrieved, and releasing a retrieved storage container 800, under the control of the control unit of the item retrieval system 312; and (ii) first actuating means for moving the container retrieval means 2218, including or together with any storage container 800 retrieved by the container retrieval means 2218, from a selected retrieval location to a selected target position under the control of the control unit of the item retrieval system 312.

For example, the retrieval location may correspond to a storage compartment or storage container position on a storage shelf (e.g. 310a, 310b), replenishment system 318 or customer locker module 1500 that is separate from the item retrieval system 312, and the target position may correspond to a predetermined item processing location within the item retrieval system 312. As another example, the retrieval location may correspond to a predetermined item processing location within the item retrieval system 312, and the target position may correspond to a storage compartment or storage container position on a storage shelf (e.g. 310a, 310b), replenishment system 318 or customer locker module 1500 that is separate from the item retrieval system 312.

In the exemplary embodiment shown in FIGS. 22 to 24, the first actuating means includes a first actuating mechanism 2222 and a second actuating mechanism 2224. The first actuating mechanism 2222 is configured to move by first drive means (e.g. an electric motor), operating under the control of the control unit of the item retrieval system 312, to different positions along a first vertical axis 2226. For example, the first actuating mechanism 2222 may move along a track formed along the support structure 2206. The second actuating mechanism 2224 is provided at an end portion of the first actuating mechanism 2222, and is also coupled to the container retrieval means 2218. The second actuating mechanism 2224 is configured to move by second drive means (e.g. an electric motor), operating under the control of the control unit of the item retrieval system 312, to: (i) rotate the container retrieval means 2218 around a vertical axis (e.g. 2226), and (ii) move the container retrieval means 2218 along a first horizontal axis 2228, which is substantially perpendicular to the vertical axis (e.g. 2226), between an extended position (distal from the first actuating mechanism 2222) and a retracted position (proximate to the first actuating mechanism 2222, e.g. as shown in FIGS. 23 and 24).

In the exemplary embodiment shown in FIGS. 22 to 24, the container retrieval means 2218 includes a base 2230, container engagement means 2232, third drive means 2234, and container identification means 2236. Preferably, the first horizontal axis 2228 is an axis that extends along (or is substantially parallel to) the longitudinal length of the base 2230. The container engagement means 2232 operates under the control of the control unit of the item retrieval system 312 to selectively engage or disengage with an external portion of a storage container 800. For example, the container engagement means 2232 may be shaped to provide a recess (or projection) that can selectively engage with or disengage from a corresponding projection (or recess) of the engagement means 808 of the storage container 800. As another example, the container engagement means 2232 magnetic component (e.g. an electromagnet) that is selectively controlled to engage with or disengage from metallic component of the engagement means 808 of the storage container 800.

When the container engagement means 2232 engages a storage container 800, the storage container 800 moves together with the container engagement means 2232. The container engagement means 2232 is configured to move by the third drive means 2234 (e.g. an electric motor), operating under the control of the control unit of the item retrieval system 312, to different positions along the first horizontal axis 2228 between an extended position (extended position (distal from the first actuating mechanism 2222) and a retracted position (proximate to the first actuating mechanism 2222). For example, the container engagement means 2232 may move along a track formed along the length of the base 2230. When the container engagement means 2232 engages a storage container 800, and the container engagement means 2232 moves to the retracted position, the storage container 800 is placed in a predetermined item processing location within the item retrieval system 312.

By controlling the movement of the first actuating mechanism 2222 and second actuating mechanism 2224, the container retrieval means 2218 can be positioned at any location in three-dimensional space in front or to the left or right side of the item retrieval system 312 (e.g. a location to retrieve or set down a storage container 800). Preferably, the container retrieval means 2218 includes an optical sensor and/or proximity sensor that allows finer adjustment of a vertical and/or horizontal location of the container retrieval means 2218 in three-dimensional space, and/or the distance between the container retrieval means 2218 and a storage container 800 and/or a portion of a storage shelf module (e.g. 310a, 310b), replenishment system 318 or customer locker module 1500.

Once the container retrieval means 2218 has moved to the instructed location in three-dimensional space, the control unit of the item retrieval system 312 performs verification checks to confirm whether the container retrieval means 2218 has been moved to the correct location. This may involve the container identification means 2236 interacting with the identification means 806 on the storage container 800 to obtain identification information for that storage container 800. For example, the container identification means may be an optical sensor (e.g. camera) configured to obtain identification information from a QR code or bar code (identification means 806) provided on the storage container 800. Alternatively, the container identification means may be an RFID sensor configured to obtain identification information from a RFID tag (identification means 806) provided on the storage container 800. By obtaining identification information for the storage container 800, the item retrieval system 312 can check (e.g. with the store control system 500) whether it has reached the correct storage container 800 location (e.g. a storage container 800 containing quantities of items ordered by the customer to be retrieved by the item retrieval system 312, or a storage compartment in a storage shelf module (310a, 310b), replenishment system 318 or customer locker module 1500 for setting down a storage container 800 carried by the item retrieval system 312).

Once it has been confirmed that the container retrieval means 2218 is positioned at the correct location, the control unit of the item retrieval system 312 controls the container retrieval means 2218 to retrieve a storage container 800 from a retrieval location (e.g. a storage compartment or storage container position on a storage shelf 310a/310b, replenishment system 318 or customer locker module 1500) and move the storage container 800 to a target location (e.g. a predetermined item processing location within the item retrieval system 312). Alternatively, the control unit of the item retrieval system 312 controls the container retrieval means 2218 to move the storage container 800 from a retrieval location (e.g. a predetermined item processing location within the item retrieval system 312) and set it down at a target location (e.g. a storage compartment of a storage shelf 310a/310b, replenishment system 318 or customer locker module 1500, or a storage container 800 in such a storage compartment).

Each item handling module configuration includes data that defines a unique predetermined combination, arrangement and/or configuration of: (i) physical equipment, components and/or sensors for use with an item handling module 2212 (e.g. for determining an identity, location or orientation of an item within a storage container 800, for retrieving an identified item in a storage container 800, and/or for placing a retrieved item into a storage container 800); and/or (ii) any operational requirements or constraints relating to such equipment, components and/or sensors of an item handling module 2212. In the example shown in FIGS. 22 to 24, the item retrieval system 312 has one item handling module 2212. However, in other embodiments (see FIG. 25), the item retrieval system 312 may have more than one item handling module 2212. According to one exemplary embodiment, one container handling module 2210 may be configured to operate with one or more item handling modules 2212. According to another exemplary embodiment, multiple container handling modules 2210 may be configured to operate with one item handling module 2212. Each predetermined item handling module configuration may specify a unique combination, configuration and/or arrangement (e.g. in terms of position, movement etc.) of one or more mechanisms and/or sensors for use with each item handling module 2212 relative to the support structure 2206, and/or the respective design, constructions and/or operations performed by or using any such mechanism or sensor of the item handling module 2212.

An item handling module 2212 includes the following main components: (i) one or more item sensors 2238; and (ii) one or more item actuating means 2240. The item sensors 2238 and item actuating means 2240 are configured in position relative to the support structure 2206 and configured for operation according to one of several predetermined item handling module configurations. Preferably, one or more item sensors 2238 are provided above the storage containers 800 placed in the predetermined item processing location for identifying a location and/or orientation of any items contained in any one of such storage containers 800. Preferably, a different set of one or more item sensors 2238 are provided above each storage container 800 placed in the predetermined item processing location, such that a different set of items sensors 2238 is used for identifying a location and/or orientation of any items contained in a different storage container 800 placed the predetermined item processing location.

The items sensors 2238 may be optical sensors (e.g. high resolution CCD cameras) that are configured to operate under the control of the control unit of the item retrieval system 312 to identify a location and/or orientation of any items contained in a retrieved storage container 800 placed in the predetermined item processing location of the item handling module 2212. The control unit of the item retrieval system 312 uses sensor data or signals generated by the item sensors 2238 to control the positioning of item actuating means 2240 in three-dimensional space and control the operation of the item actuating means 2240 to engage with an item to be retrieved.

The item actuating means 2240 includes: (i) item retrieval means 2242 for releasably engaging an item to be retrieved from a retrieved storage container 800 placed in the predetermined item processing location, and releasing said retrieved item into said another storage container 800a, under the control of the control unit of the item retrieval system 312; and (ii) second actuating means 2244 for moving the item retrieval means 2242 (including any item retrieved by the item retrieval means 2242) from a selected retrieval location proximate to the retrieved storage container 800 placed in the predetermined item processing location to a selected target position proximate to another storage container 800a under the control of the control unit of the item retrieval system 312.

For example, the item retrieval means 2242 may use a suction mechanism to reach into a storage container 800 at a target location (e.g. from either a retrieved storage container 800 placed in the predetermined item processing location, or from another storage container 800a on the item retrieval system 312 for storing items ordered by a particular customer) and engage with an item to be retrieved from that target location. Once an item has been engaged, the item retrieval means 2242 moves away from the storage container 800 at the target location, and the second actuating means 2244 moves the item retrieval means 2242 towards a target position (e.g. towards another storage container 800a on the item retrieval system 312 for storing items ordered by a particular customer, or towards a retrieved storage container 800 placed in the predetermined item processing location). Once the item retrieval means 2242 reaches the target position, the item retrieval means 2242 extends in the storage container 800 or 800a at the target position, and releases the retrieved item therein.

This process is repeated until the required number of items to be retrieved (e.g. the number of the relevant items ordered by the customer) is retrieved from the storage container 800 at the predetermined item processing location to another storage container 800a for storing items ordered by the customer. Alternatively, the process is repeated until the required number of items is transferred (e.g. for restocking purposes) from a storage container 800a storing items to be restocked, to a storage container 800 at the predetermined item processing location. Once the required number of items have been retrieved or transferred, the container handling module 2210 returns the storage container 800 at the predetermined item processing location to the relevant storage compartment or storage container position on a storage shelf 310a/310b, replenishment system 318 or customer locker module 1500.

Preferably, each module (e.g. any one of 2208a, 2208b, 2210, 2212) of the item retrieval system 312 communicates with the control unit of the item retrieval system 312 via a wired or wireless communications channel. Preferably, the communications channel may be a shared communications channel for one or more of the modules to communicate with the control unit. Alternatively, the communications channel may be a dedicated communications channel for a specific module to communicate with the control unit. In this way, the modules operate under the control of control information, data or signals generated by the control unit of the item retrieval system 312 that are sent to a specific module via the communications channel.

Preferably, each module (e.g. any one of 2208a, 2208b, 2210, 2212) of the item retrieval system 312 includes a coupling mechanism by which the module releasably engages with one of several predetermined coupling portions of the support structure 2206. Preferably, when a module (e.g. any one of 2208a, 2208b, 2210, 2212) is coupled to the support structure 2206, the coupling mechanism establishes a communications connection between each predefined module (2208a, 2208b, 2210, 2212) and the control system of the item retrieval system 312.

Preferably, when the drive unit 2202 is releasably coupled to the base 2204, the movement of the drive unit 2202 moves the base 2204 together with the control unit of the item retrieval system 312 and any modules (2208a, 2208b, 2210, 2212) coupled to the support structure 2206 extending from the base 2204. Preferably, when the drive unit 2202 is decoupled from the base 2204, said modular item retrieval system and drive unit are each configured for independent operation under the control of said store control system.

In the exemplary embodiment shown in FIG. 25, before the drive unit 2202 decouples from the upper structure 2200, one or more legs 2502 of the upper structure 2200 extend from the base 2204 to the floor surface. The one or more legs 2502 support the upper structure 2200 in a raised position from the floor surface. In this configuration, the drive unit 2202 can decouple and move away from the upper structure 2200, while the upper structure 2200 remains at a stationary position relative to the floor surface. Once separated, the drive unit 2202 can move separately and independently of the upper structure 2200. When it is desirable to move the upper structure 2200, a drive unit 2202 can move under the upper structure 2200 and couple with the upper structure 2200. Once the drive unit 2202 is coupled to the upper structure 2200, the one or more legs 2502 are retracted away from the floor surface, such that the entire upper structure 2200 rests on the drive unit 2202. In this configuration, both the drive unit 2202 and upper structure 2200 can move together.

Preferably, the drive unit 2202 includes one or more wheels 2246, wherein the rotation or operation of at least some of the wheels 2246 is controlled by the control unit of the drive unit 2202 to control the movement of the drive unit 2202 (e.g. move forwards, backwards, turn left or turn right) on a floor surface on which the drive unit 2202 is placed.

Preferably, at least some of the wheels 2246 of the drive unit 2202 are controlled to maintain the base 2204 and the modules (e.g. 2208a, 2208b, 2210, 2212) coupled to the upper structure 2200 at a substantially horizontal level during acceleration and deceleration of the drive unit 2202. This may be achieved by the control unit of the item retrieval system 312 selectively controlling: (i) a rate of acceleration and/or deceleration of one or more electric motors used to drive the wheels 2246; or (ii) the dampening characteristics of a suspension system coupled one or more of the wheels 2246.

The advantage of the modular item retrieval system 312 is that it can be adapted, according to predetermined configurations, to perform any desired function or configuration. For example, an item retrieval system 312 may be configured with a plurality of container handling modules 2210 that can perform item (or storage container) retrieval and/or restocking operations simultaneously to enhance efficiency. Such retrieval and/or restocking operations can be performed by interacting with storage shelf modules 310a/310b, replenishment systems 318 and/or customer locker module 1500 located on any side of the item retrieval system 312 to further enhance efficiency. Certain item retrieval system 312 may be configured to only perform container and item handling operations, while other item retrieval system 312 may be configured to only provide mobile storage bay modules, and both types of item retrieval system 312 can work together to enhance efficiency. An advantage of the modular design of item retrieval system 312 is that it can be quickly built and configured according to predetermined configuration which reduces time to deployment, and any failure of a particular module can be quickly and easily replaced, thus reducing downtime.

Replenishment Process

A unique aspect of the invention is that items that are provided to, or can be ordered from, each automated retail store system 106 are organised into storage containers 800. Each storage container 800 serves as the basic unit by which items are transported, stored and/or retrieved within an automated retail store system 106. Preferably, all storage containers 800 in an automated retail store system 106 have the same predetermined size (i.e. each storage container has the same external dimensions in length, width and height). However, in other embodiments, an automated retail store system 106 can use storage containers 800 of different sizes (e.g. where at least some of the storage containers have an external length, width and height that is an integer multiple of a predetermined length, width or height defined for a single basic storage container 800).

Preferably, to enhance efficiency of item retrieval and restocking operations, only items of the same type or description (e.g. items associated with the same SKU or item type identifier) are stored in the same storage container 800. In another embodiment, to enhance storage space utilisation or efficiency, items of different type or description (e.g. items associated with different SKUs or item type identifiers) may be stored in the same storage container 800. The respective types and quantities of items in each storage container 800 (e.g. the item type identifiers and respective quantities of the items, and a unique storage container identifier) are stored in a database (e.g. IMAX 110) at the time the items are placed into the storage container 800. When a storage container 800 containing items is placed into a replenishment system 318 for transportation to a particular automated retail store system 106, the unique identifier for that storage container 800 is stored in a database (e.g. IMAX 110) in association with the unique identifier for the replenishment system 318 and the unique store identifier for the automated retail store system 106 to which the storage container 800 is to be delivered.

When the replenishment system 318 arrives at the automated retail store system 106, one or more sensors in the replenishment zone 308 (operating under the control of the store control system 500) read, detect or determined the unique identifiers of each replenishment system 318 entering the replenishment zone 308. Based on these unique identifiers of the replenishment system 318 read, detected or determined by the sensors, the store control system 500 retrieves from the database (e.g. IMAX 110) the unique identifiers for the storage containers 800 stored in each replenishment system 318, and the unique identifiers for the items (and their item types) stored in each of those storage containers 800. This enables the store control system 500 to determine the items and their respective quantities for restocking the automated retail store system 106. The retrieved identifiers are stored in a database accessible by the storage control system 500 (e.g. a local database).

For each storage compartment of a storage shelf module (e.g. 310a, 310b) provided in the automated retail store system 106, the store control system 500 stores in the database (e.g. local database) a unique storage compartment identifier associated with that storage compartment, and a unique location in three dimensional space for accessing that storage compartment. The store control system 500 determines an available storage compartment of a storage shelf module (e.g. 310a, 310b) for storing each storage container 800 containing items for restocking the automated retail store system 106. In this context, an available storage compartment of a storage shelf module (e.g. 310a, 310b) may be any one of: (i) a storage compartment that has space for receiving and storing a storage container 800 retrieved from the replenishment system 318; (ii) a storage compartment having a storage container 800 that the store control system 500 has identified for removal from the automated retail store system 106, which when removed, the storage compartment has space for receiving and storing a storage container 800 retrieved from the replenishment system 318; and (iii) a storage compartment having a storage container 800 that is partially filled with items of the same type or description as items in a storage container 800 retrieved from the replenishment system 318. In scenario (iii) above, the partially filled storage container 800 can be replenished with one or more items from the storage container 800 retrieved from the replenishment system 318, or partially filled storage container 800 can be replaced with the storage container 800 retrieved from the replenishment system 318 as per scenario (i) above.

Replenishment of items stored in a storage container 800 received in a storage shelf module (e.g. 310*a*, 310*b*) is performed by an item retrieval system 312 operating under the control of the store control system 500. Each item retrieval system 312 comprises of an upper structure 2200 and drive unit 2202, each of which is associated with a unique item retrieval system identifier. The store control system 500 can separately control the operations performed by each of the upper structure 2200 and drive unit 2202 by sending control signals, data or instructions associated with their respective unique item retrieval system identifiers. This allows the store control system 500 to control the upper structure 2200 and drive unit 2202 to perform different and unrelated operations when both are separated from each other. When an upper structure 2200 and drive unit 2202 are coupled together, the store control system 500 can control both the upper structure 2200 and drive unit 2202 to perform their respective operations in a coordinated way such that the upper structure 2200 and drive unit 2202 work together as a single integrated device.

For replenishing items, the store control system 500 500 (and/or the item retrieval system control module 506) controls a drive unit 2202 to move an upper structure 2200 to a location adjacent to a replenishment system 318, and then controls the container handling module 2210 of the upper structure 2200 to retrieve a storage container 800 containing items for replenishing the automated retail store system 106. The storage container 800 may be retrieved from an identified target storage compartment of a replenishment system 312. Once a storage container 800 containing replenishment items has been retrieved, the store control system 500 (and/or the item retrieval system control module 506) controls the container handling module 2210 and/or item handling module 2212 of the upper structure 2200 to perform at least one of the following:

(i) control the container handling module 2210 to move the retrieved storage container 800 into an available storage bay module (e.g. 2208*a* or 2208*b*) of the item retrieval system 312; and (ii) control the container handling module 2210 to move the retrieved storage container 800 to a predetermined item processing location that is accessible by an item handling module 2212. When the retrieved storage container 800 is at the predetermined item processing location, the first actuating means (e.g. including 2222 and 2224) of the item handling module 2212 is controlled to move one or more identified items from the retrieved storage container 800 to another storage container 800*a* located in a storage compartment of the item handling module 2212.

In other words, replenishment items can be transferred from a replenishment system 318 to an item handling module 2212 by transfer of a storage container 800 of items, or by transfer of items between different a retrieved storage container 800 and another storage container 800*a* in the item retrieval system 312.

The store control system 500 then identifies an available storage compartment of a storage shelf module (e.g. 310*a*, 310*b*) based on scenarios (i), (ii) or (iii) as described above. The store control system 500 then retrieves the storage compartment identifier and access location in three-dimensional space for the identified storage compartment.

The store control system 500 (and/or the item retrieval system control module 506) then controls a drive unit 2202 to move the upper structure 2200 (with the retrieved storage container 800 or relevant replenishment items) to an aisle 413 position adjacent to the access location for the identified storage compartment. The store control system 500 (and/or the item retrieval system control module 506) may control the movement of the drive unit 2202 based on map data (e.g. accessed from the local database) representing one or more of the following: (i) the unique locations in three-dimensional space for accessing each storage compartment in the automated retail store system 106; (ii) the unique locations in three-dimensional space for accessing each of customer locker compartment 1502 and/or customer storage compartment 1504 in the automated retail store system 106; (iii) the unique locations in three-dimensional space for accessing each storage compartment in a replenishment system 318 received in the replenishment zone 308 of the automated retail store system 106; (iv) the physical boundaries of any fixtures (e.g. storage shelf modules 310*a*, 310*b*, access barriers 316, etc.) or any known or identified obstacles present in the automated retail store system 106; and (v) the location of each upper structure 2200 and drive unit 2202 in the automated retail store system 106. An obstacle can refer to any object that may interfere with the normal movement of an item retrieval system 312 inside the automated retail store system 106 (e.g. a foreign object or a damaged part of the store floor space).

Known obstacles can be identified in the map data during the store setup process, and additional obstacles can be detected using one or more sensors fitted inside the automated retail store system 106 during operation where such additional obstacles are automatically added to the map data upon detection or can be automatically removed from the map data upon detecting that the obstacle no longer exists. Based on the map data, the store control system 500 (and/or the item retrieval system control module 506) generates appropriate control signals, data or instructions for controlling a drive unit 2202 to move an upper structure 2200 from a starting location to a destination location within the automated retail store system 106. The store control system 500 (and/or the item retrieval system control module 506) may control drive unit 2202 to move from the starting location to the destination location (or along a select one of various possible paths generated by the control system 500 or 506) based on one or more of the following factors: (i) an estimated (and preferably minimal) travel distance between the starting location and destination location; (ii) an estimated (and preferably minimal) travel time between the starting location and destination location; (iii) any presence of an obstacle along a potential travel path for the drive unit 2202; (iv) any presence of another drive unit 2202 or upper structure 2200 along a potential travel path for the drive unit 2202.

Once the drive unit 2202 and upper structure 2200 arrives at the destination location, the store control system 500 (and/or the item retrieval system control module 506) then controls the container handling module 2210 and/or item handling module 2212 of the upper structure 2200 to perform at least one of the following:

(i) control the container handling module 2210 to retrieve a storage container 800 from the identified storage compartment of a storage shelf module (e.g. 310a, 310b), and move the retrieved storage container 800 to an available storage bay module (e.g. 2208a, 2208b) of the upper structure 2200;

(ii) control the container handling module 2210 to retrieve a storage container 800 from a storage bay module (e.g. 2208a, 2208b) of the upper structure 2200, and move the retrieved storage container 800 to the identified storage compartment of a storage shelf module (e.g. 310a, 310b);

(iii) control the container handling module 2210 to retrieve a storage container 800 from the identified storage compartment of a storage shelf module (e.g. 310a, 310b), and move the retrieved storage container 800 to a predetermined item processing location that is accessible by an item handling module 2212. When the retrieved storage container 800 is at the predetermined item processing location, the first actuating means (e.g. including 2222 and 2224) of the item handling module 2212 is controlled to move one or more identified items from the retrieved storage container 800 to another storage container 800a located in a storage compartment of the item handling module 2212 (or vice versa);

(iv) control the container handling module 2210 to retrieve a storage container 800 from the predetermined item processing location, and move the retrieved storage container 800 to the identified storage compartment of a storage shelf module (e.g. 310a, 310b);

(v) control the container handling module 2210 to retrieve a storage container 800 from either the predetermined item processing location or a storage compartment of the item handling module 2212, and move the retrieved storage container 800 to an available storage bay module (e.g. 2208a, 2208b) of the upper structure 2200; and (vi) control the container handling module 2210 to retrieve a storage container 800 from a storage bay module (e.g. 2208a, 2208b) of the upper structure 2200, and move the retrieved storage container 800 to either the predetermined item processing location or a storage compartment of the item handling module 2212.

In other words, replenishment items can be transferred from an item handling module 2212 to a storage compartment of a storage shelf module (e.g. 310a, 310b) by transfer of a storage container 800 of items, or by transfer of items between different a retrieved storage container 800 and another storage container 800a in the item retrieval system 312.

Preferably, before the container handling module 2210 is controlled to move a storage container 800 to storage compartment of a storage shelf module (e.g. 310a, 310b), one or more sensors (e.g. optical sensors) of the item retrieval system 312 operate under the control of the store control system 500 (and/or the item retrieval system control module 506) to determine the identity and respective quantities of the items being removed from and/or placed into a storage compartment of a storage shelf module (e.g. 310a, 310b). This allows the store control system 500 to check whether the level of stock for that item is the same as that recorded in the database (e.g. the local database), and make any adjustments to ensure accurate counting of stock level. For example, the database may record receiving a replenishment system 318 with a storage container 800 reported as containing 50 cans of a particular soft drink, but upon checking by the sensors of the item retrieval system 312 it is confirmed that the storage container 800 only contains 49 cans of that soft drink (instead of 50). In this scenario, the store control system 500 updates the level of stock for that item to reflect the actual quantity confirmed by the sensors of the item retrieval system 312. In another scenario, the sensors of the item retrieval system 312 may identify one or more defective or damaged items in the storage container 800. The item retrieval system 312 will report this to the store control system 500, and the store control system 500 then controls the item retrieval system 312 to remove the defective or damages items from the storage container 800, and updates the level of stock for that item to reflect the actual quantity of stock for that item in the storage container 800, before the storage container 800 is placed into a storage compartment of a storage shelf module (e.g. 310a, 310b).

Stock Out Process

The stockout process is similar to the replenishment process described above with the following exceptions. Instead of the item retrieval system 312 retrieving a storage container 800 from a replenishment system 318, the stock out process involves the item retrieval system 312 retrieving a storage container 800 from a storage compartment of a storage shelf module (e.g. 310a, 310b) that has been identified by the store control system 500 as containing an item in a customer's order information to be retrieved by an item retrieval system 312. Furthermore, instead of the item retrieval system 312 placing a storage container carried by the item retrieval system 312 to a storage container 800 from a storage compartment of a storage shelf module (e.g. 310a, 310b), the stock out process involves the item retrieval system 312 placing a storage container carried by the item retrieval system 312 to either an available customer locker compartment 1502 or customer storage compartment 1504 of a customer locker module 1500.

In the specification, unless specified otherwise, the terms "comprising", "comprise", and grammatical variants thereof, intended to represent open or inclusive language such that they include the recited elements but also permit inclusion of additional, non-explicitly recited elements.

While this invention has been described with reference to exemplary embodiments, it will be understood by those skilled in the art that various changes can be made and equivalents may be substituted for elements thereof, without departing from the spirit and scope of the invention. In addition, modification may be made to adapt the teachings of the invention to particular situations and materials, without departing from the essential scope of the invention. Thus, the invention is not limited to the particular examples that are disclosed in this specification, but encompasses all embodiments falling within the scope of the appended claims.

The invention claimed is:

1. A retail system, including:

a plurality of automated retail store systems located at different retail sites, each said automated retail store system being adapted to store a variety of different items;

a retail management system including a processor and communication interface, configured to receive, from a customer, order information relating to an order, and based on said order information, control the operation of said automated retail store system selected by said customer for said order; and wherein the selected said automated retail store system, under the control of said retail management system, includes one or more item retrieval systems configured to: (i) retrieve from a storage shelf unit identified by said retail management system one or more stored items corresponding to the items identified in said order information, and (ii) at a scheduled time before a pickup time specified in said order information, place the retrieved items into a customer locker compartment of a customer locker unit, wherein said customer locker compartment is only accessible by said customer after verification of said customer;

wherein each said item retrieval system:

includes a support structure extending upwards from a base and controls the operations performed by predefined modules of said item retrieval system, under the control of a store control system and/or said retail management system, wherein said predefined modules include the following types of modules:

a) a storage bay module configured according to a selected one of first several predetermined configurations for storing one or more removable storage containers, each of the first several predetermined configurations specifies locations where said storage bay module is coupled to said support structure;

b) a container actuating mechanism configured according to a selected one of second several predetermined configurations, each said container actuating mechanisms comprising container engagement means and being configured to operate under the control of said item retrieval system to perform predefined container handling operations, said predefined container handling operations including retrieving a storage container by engaging said storage container via said container engagement means from a selected retrieval location in three-dimensional space proximate to said item retrieval system, and moving the retrieved storage container to a selected target position in three-dimensional space proximate to said item retrieval system, each of the several predetermined configurations specifies a position and/or movement of one or more mechanisms and/or sensors of use with said container actuating mechanism relative to said support structure; and c) an item retrieval mechanism configured according to a selected one of third several predetermined configurations, each said item retrieval mechanism being configured to operate under the control of said item retrieval system to perform predefined item handling operations including identifying items in a retrieved storage container, retrieving a selected item from the retrieved storage container, and placing the selected item into another storage container proximate to said item retrieval system, each of the third several predetermined configurations specifies a position and/or movement of one or more mechanisms and/or sensors for use with said item retrieval mechanism relative to said support structure;

wherein said storage bay module, said container actuating mechanism and said item retrieval mechanism are integrated into said item retrieval system along said support structure by releasably coupling to said support structure, respectively, and the number and/or position of said storage bay module, said container actuating mechanism and said item retrieval mechanism with respect to said support structure are configurable, respectively, based on one of the first, second and third several predetermined configurations.

2. The retail system of claim 1, wherein said item retrieval system further comprises:

a drive unit, including one or more wheels, coupled to the base for moving said item retrieval system relative to a floor surface on which said item retrieval system is placed, wherein said drive unit is configured to operate separately and independently under the control of a store control system.

3. The retail system of claim 1, wherein:

the selected said automated retail store system is configured to retrieve some of the items in said order; and said retail management system is configured to generate separate order information for an alternative supply location for the remaining items in said order.

4. The retail system of claim 3, wherein:

said retail management system is configured to generate delivery instructions for a courier to pickup the items identified in said separate order information from said alternative supply location, and deliver said items into said customer locker compartment of the selected said automated retail store system by said pickup time.

5. The retail system of claim 1, wherein said retail management system is configured to:

receive, from a specific said automated retail store system, a request for restocking of one or more items to be restocked or information representing a status of a quantity or level of one or more items in said automated retail store system; and generate separate order information for an alternative supply location for one or more items to be restocked; and generate delivery instructions for a courier to pickup the items identified in said separate order information from said alternative supply location, and deliver said items into said customer locker compartment of the specific said automated retail store system.

6. The retail system of claim 1, wherein said automated retail store system provides automated storage and retrieval of multiple items identified in a customer order at a single retail site, the automated retail store system including:

a store control system comprising a computer adapted to operate under the control of control signals generated based on order information for an order by a customer, said order information including information representing one or more items and a pickup time;

one or more storage shelf units, each said storage shelf unit having different internal portions provided according to different predefined modular configurations, each said storage shelf unit having at least one said internal portion configured to provide a storage compartment for storing one or more removable storage containers, said storage containers for storing a range of different items;

one or more said customer locker units, each said customer locker unit having different internal portions provided according to different predefined modular configurations, each said customer locker unit having at least one said internal portion configured to provide said locker compartment;

said one or more item retrieval systems adapted to operate under the control of said store control system; and wherein said retail management system is further adapted to operate under the control of said store control system to: verify an identity of said customer or a unique identifier for said order, and allow said customer to access said items in said customer locker compartment only when said identity or said identifier has been successfully verified.

7. The retail system of claim 6, wherein said order information is:
generated based on customer input received by a user interface module of said automated retail store system; or
received from a separate computer system or separate user device that communicates with said store control system via a communications network or channel.

8. The retail system of claim 6, wherein each said storage container is adapted to store quantities of a particular item, and wherein said storage containers are of a predetermined size and are adapted for storing items of different size, orientation and/or of irregular shape.

9. The retail system of claim 6, wherein at least some of said storage compartments are adapted for storing said items at ambient temperature.

10. The retail system of claim 6,
wherein at least some of said storage containers are located inside an enclosed said storage compartment for storing said items in a temperature controlled or refrigerated environment; and
wherein external access to the enclosed storage compartment is controlled by one or more access barriers, each said access barrier being adapted to be controlled by said store control system to be moveable between: (i) an open position that defines an opening through which said items can be placed into or retrieved from one or more of said storage channels in said compartment, and (ii) a closed position to form an enclosed storage compartment in which the one or more access barriers resist an escape of temperature controlled or refrigerated air from inside the compartment.

11. The retail system of claim 6, including said item retrieval systems with one or more sensors for obtaining information representing or for determining one or more of:
i) a count of a number of said items currently in a said storage container;
ii) a count of a number of said items added to a said storage container;
iii) a count of a number of said items retrieved from a said storage container;
iv) a time at which a particular said item is added to a said storage container;
v) a time at which a particular said item is retrieved from a said storage container;
vi) an expiry date for a particular item added to a said storage container; and
vii) a visual representation of a physical condition of said items in a said storage container.

12. The retail system of claim 11,
wherein said store control system determines a number of said items currently in said storage container based on one or more of parameters (i), (ii) and (iii) in claim 11;
wherein, if the determined number of items in said storage container is below a predetermined threshold value, said store control system generates a restock request for restocking a quantity of said items associated with said storage container.

13. The retail system of claim 11,
wherein said store control system determines an expiry date for each said item stored in said storage container based on one or more of parameter (iv) in claim 11 and expiry date data associated with each said item;
wherein, said store control system controls a said item retrieval system to remove said items from said storage container that have expired or are about to expire.

14. The retail system of claim 11, wherein said store control system determines, based on said visual representation, whether there is a potential physical defect with any of said items in said storage container.

15. The retail system of claim 6, wherein the automated retail store system including:
a restocking locker for receiving a restocking container containing one or more items;
a said item retrieval system adapted to operate under the control of said store control system, the item retrieval system including means for retrieving a restocking container from said restocking locker, retrieving an item from said retrieved restocking container, and a sensor for obtaining a unique identifier from the retrieved item;
wherein if said store control system determines, based on the obtained identifier, that restocking of said item is not required, the store control system controls the item retrieval system to place any said items associated with said identifier into a separate reject container for removal; and
wherein if said store control system determines, based on the obtained identifier, that restocking of said item is required, the store control system determines a target said storage container in a storage compartment for storing said item, and controls the item retrieval system to place said item into said target storage container.

16. The retail system of claim 6,
wherein each said customer locker compartment includes a storage compartment for receiving at least one said storage container, and an access barrier for controlling a customer's access to the contents of said storage compartment; and
wherein said access barrier is generally configured in a locked state to prevent customer access to said storage compartment, and said access barrier is configured in an unlocked state to allow customer access to said storage compartment only when said identity of said customer or said unique identifier associated with said order has been successfully verified.

17. The retail system of claim 6, wherein:
said item retrieval system retrieves one or more said storage containers containing different said items from an identified storage compartment in a replenishment system; and
said item retrieval system places the one or more of said retrieved storage containers to an identified said storage compartment of said storage shelf unit.

18. The retail system of claim 6, wherein:
said item retrieval system retrieves one or more said storage containers containing different said items from an identified storage compartment of said storage shelf unit; and
said item retrieval system places the one or more of said retrieved storage containers to an identified customer locker compartment or an identified customer storage compartment of said customer locker unit.

19. A retail site including the retail system of claim 6.

20. The retail system of claim 1, wherein the automated retail store system includes an automated retail store management system including:

a processor adapted to communicate with one or more automated retail store system as claimed in claim 6 by sending control signals and receiving of response signals via a communications network;

wherein said control signals include information for controlling one or more of the operations performed by a particular said automated retail store system; and wherein said response signals includes information representing a state, status or request relating to one or more of the operations performed by said automated retail store system.

21. The retail system of claim 20, wherein said processor is adapted to:

receive order information for a customer order from an ordering system, said order information including at least unique identifiers for one or more items, a pickup time, and a unique identifier for a said automated retail store system;

determine an availability of said items in said order at the identified automated retail store system;

generate, based on the availability of said items at the identified automated retail store system, one or more said control signals for said identified automated retail store system for retrieving one or more items identified in said order information by said pickup time; and transmit said one or more control signals to the identified automated retail store system.

22. The retail system of claim 21, wherein said processor is further adapted to:

determine an availability of one or more of said items in said order at one or more alternative supply locations including at least one of: (i) a supply warehouse, and (ii) another automated retail store system within a predetermined proximity of the identified automated retail store system; and generate, based on the determined availability of the remaining said items at said alternative supply locations, suborder information for each of one or more said alternative supply locations, each said additional suborder information including a respective scheduled pickup time set before the pickup time in said order.

23. The retail system of claim 22, wherein said processor is further adapted to:

generate delivery instructions for a courier to collect said items retrieved based on said suborder information from the alternative supply locations by the corresponding scheduled pickup time; and generate delivery instructions for a courier to load the retrieved items into the identified automated retail store system before the pickup time.

24. The retail system of claim 23, wherein said processor is adapted to:

communicate with a restocking system for a supply warehouse in response to receiving a response signal from an automated retail store system representing a request for restocking of one or more items to be restocked, or a response signal from said automated retail store system representing a quantity or level of one or more a particular item in said automated retail store system.

25. The retail system of claim 1, wherein said storage shelf unit comprises:

one or more storage shelf modules;

each said storage shelf module having an internal storage space configured to provide a plurality of storage compartments for storing one or more removable storage containers;

wherein each said storage shelf module is configured according to one of several different predetermined storage shelf module configurations, each said storage shelf module configuration providing a different internal spatial and/or functional configuration of one or more said storage compartments of the storage shelf module based on a unique predetermined combination, arrangement and/or configuration of one or more releasably coupled configuration modules for each said storage compartment;

wherein each said storage shelf module includes coupling means for releasably coupling a said storage shelf module with one or more adjacent said storage shelf modules, such that a plurality of said storage shelf modules are securely coupled together to form a customised said storage shelf unit that is adapted to fit within said floor space area of a predefined size and shape.

26. The retail system of claim 1, wherein said customer locker unit comprises:

one or more customer locker modules;

each said customer locker module having an internal storage space configured to provide one or more customer locker compartments each for storing a removable storage container, each said customer locker compartment including an access barrier for controlling customer access to the contents of a said storage container stored in said customer locker compartment;

wherein each said customer locker module is configured according to one of several different predetermined customer locker module configurations, each said customer locker module configuration providing a different internal spatial and/or functional configuration of each said customer locker compartments of the customer locker module based on a unique predetermined combination, arrangement and/or configuration of one or more related physical equipment, components, modules and/or sensors for use with each said customer locker compartment, wherein each said customer locker module is configured to: (i) verify at least one of an identify of a customer or a unique identifier associated with a customer's order; and (ii) only allow a customer access to items ordered by the customer from a said customer locker compartment when said identity of the customer or said unique identifier associated with said order has been successfully verified.

\* \* \* \* \*